US007999989B2

(12) United States Patent
Asai et al.

(10) Patent No.: US 7,999,989 B2
(45) Date of Patent: Aug. 16, 2011

(54) PHOTOCHROMIC FILM, PHOTOCHROMIC LENS COMPRISING THE SAME, AND METHOD OF MANUFACTURING PHOTOCHROMIC LENS

(75) Inventors: Osamu Asai, Shinjuku-ku (JP); Eiichi Yajima, Shinjuku-ku (JP); Hiroshi Ohta, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 135 days.

(21) Appl. No.: 12/307,057

(22) PCT Filed: May 31, 2007

(86) PCT No.: PCT/JP2007/061103
§ 371 (c)(1),
(2), (4) Date: Jun. 9, 2009

(87) PCT Pub. No.: WO2008/001578
PCT Pub. Date: Jan. 3, 2008

(65) Prior Publication Data
US 2009/0316246 A1    Dec. 24, 2009

(30) Foreign Application Priority Data

Jun. 30, 2006 (JP) ................. 2006-181073
Jun. 30, 2006 (JP) ................. 2006-181077

(51) Int. Cl.
*G02F 1/00* (2006.01)
(52) U.S. Cl. ..................................... 359/241
(58) Field of Classification Search .............. 359/241; 264/1.7; 65/30.11
See application file for complete search history.

(56) References Cited

U.S. PATENT DOCUMENTS

2005/0116381 A1 * 6/2005 Wong et al. ............ 264/236

FOREIGN PATENT DOCUMENTS

| JP | 11-352302 A | 12/1999 |
| JP | 2002-539291 A | 11/2002 |
| JP | 2003-519398 A | 6/2003 |
| WO | 00/55653 A1 | 9/2000 |
| WO | 01/49478 A2 | 7/2001 |

* cited by examiner

*Primary Examiner* — Joseph Martinez
(74) *Attorney, Agent, or Firm* — Sughrue Mion, PLLC

(57) ABSTRACT

The present invention relates to a photochromic film comprising a photochromic dye and a resin component. The photochromic film has a nanoindentation hardness of equal to or greater than 800 nm on at least one of surfaces, surface A, thereof. The present invention further relates to a method of manufacturing a photochromic lens. The method of manufacturing a photochromic lens of the present invention comprises forming a photochromic film having a nanoindentation hardness ranging from 500 to 5000 nm on an outermost surface thereof as well as having a smaller nanoindentation hardness on a surface facing a first mold than that on the outermost surface by coating a photochromic liquid comprising a photochromic dye and a curable component on one surface of the first mold for formation of one of surfaces of a lens and subjecting the photochromic liquid to curing treatment, and a photochromic lens comprising a photochromic film on a lens substrate is obtained by means of the above first mold.

22 Claims, 5 Drawing Sheets

[Fig. 1]
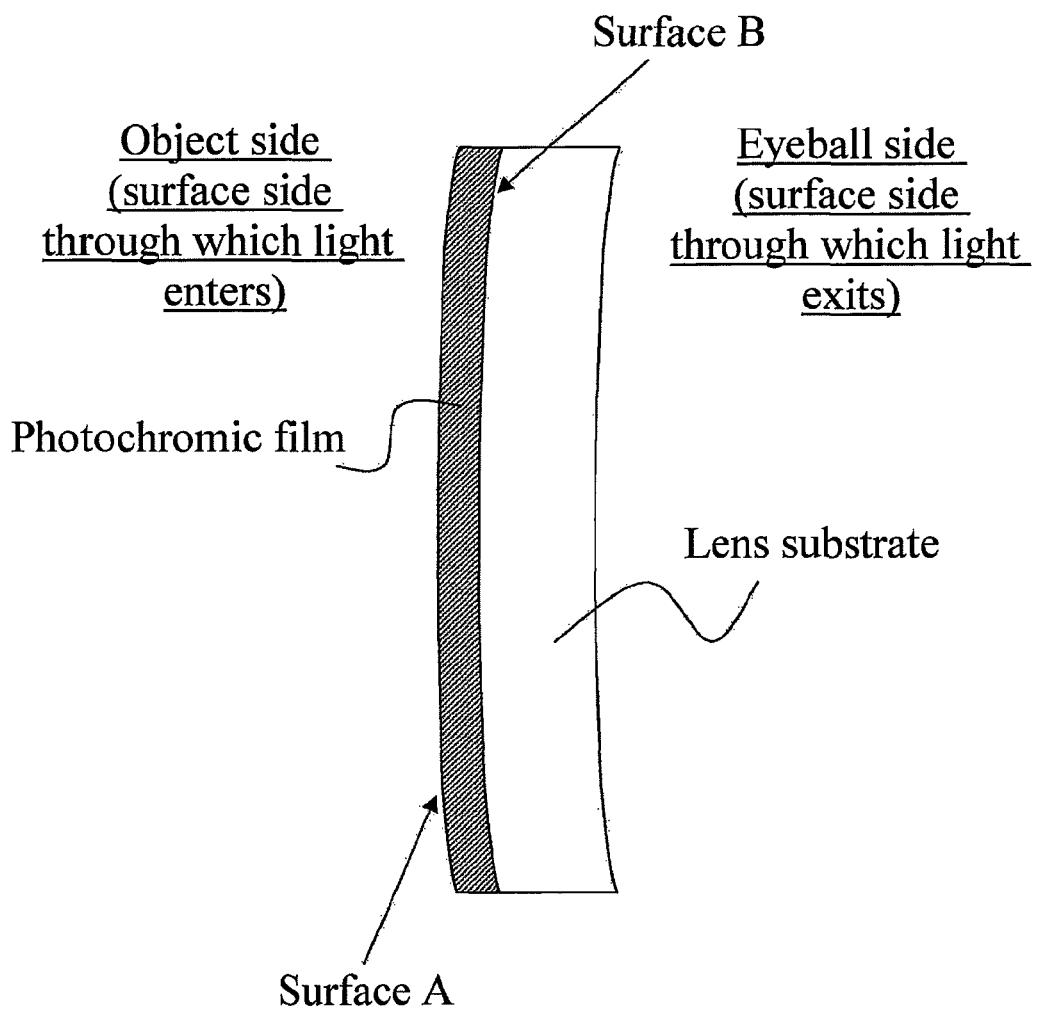

[Fig. 2]
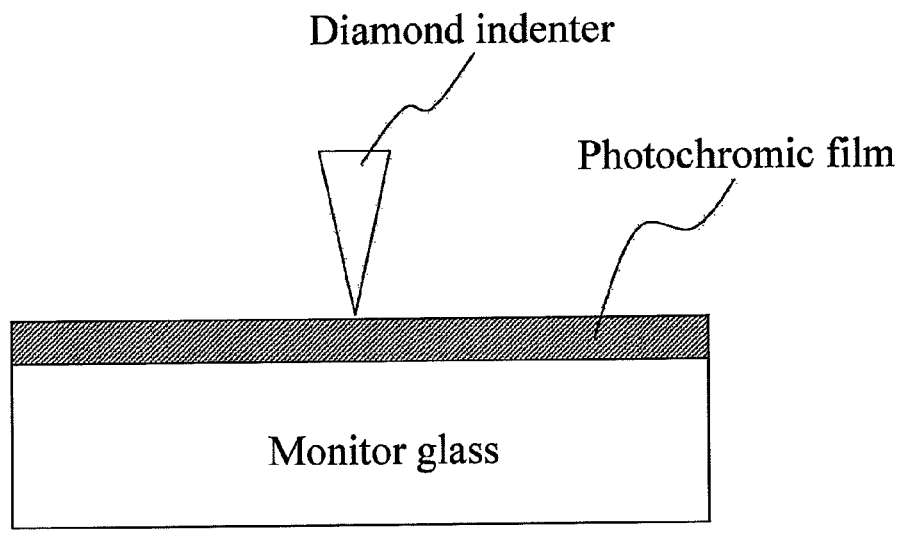
[Fig. 3]
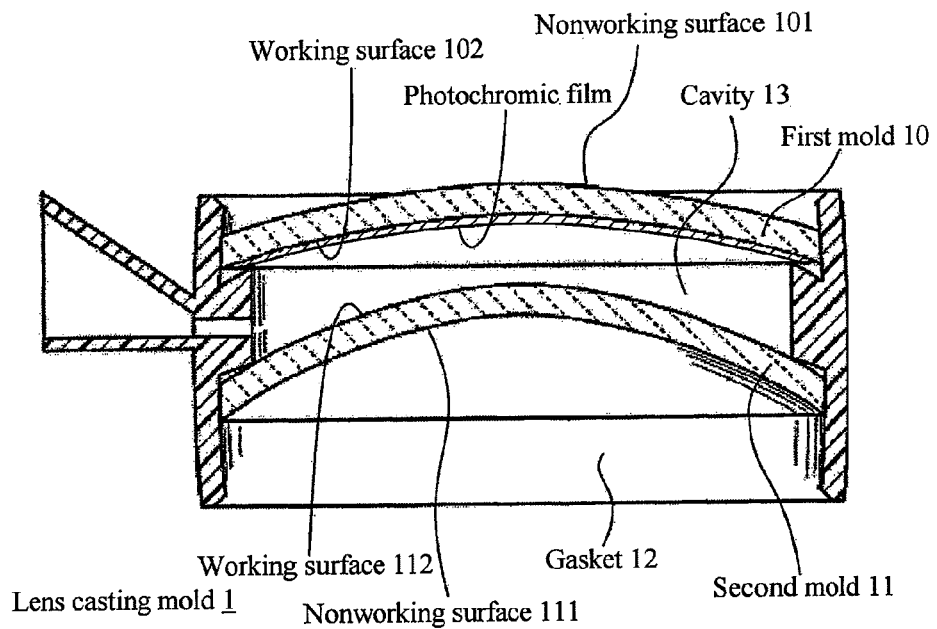

[Fig. 4]
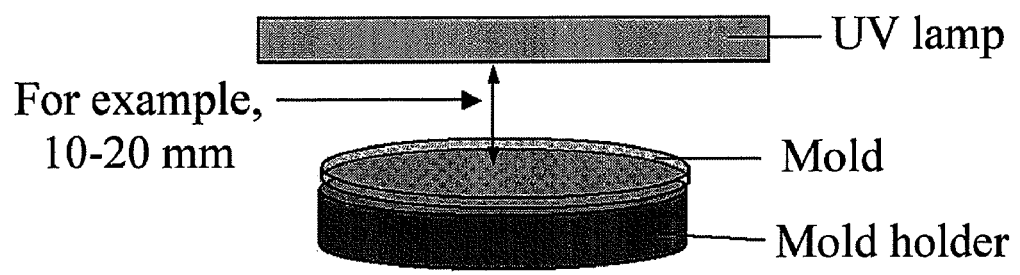

[Fig. 5]
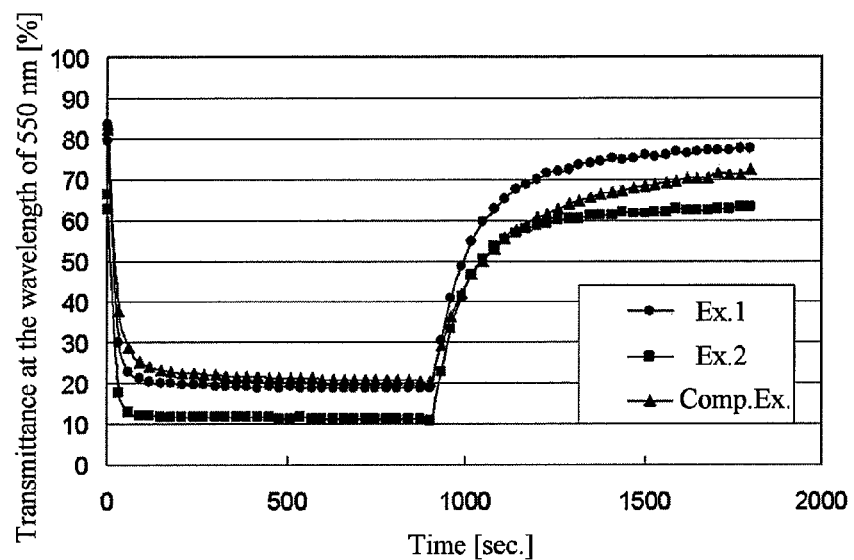
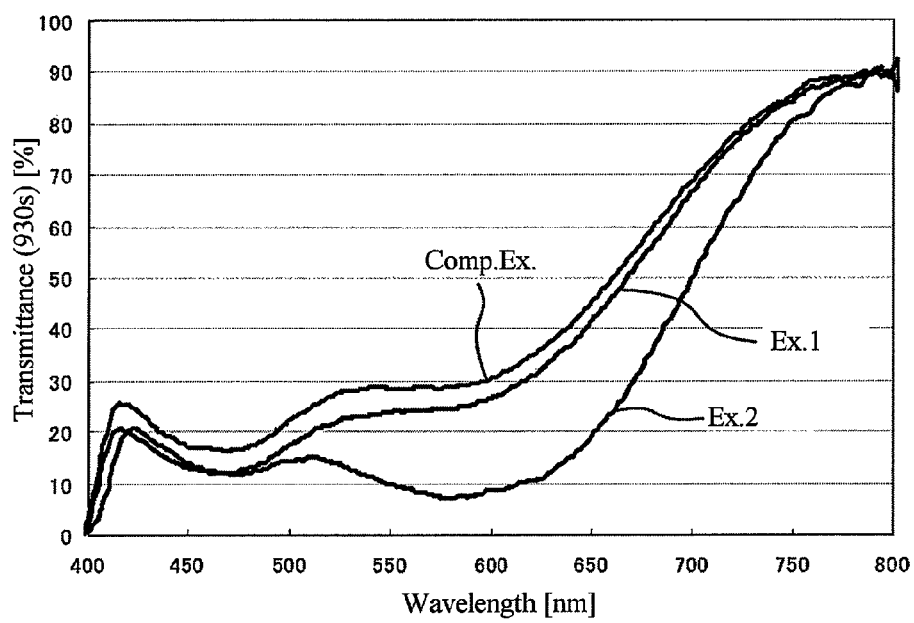

[Fig. 6]
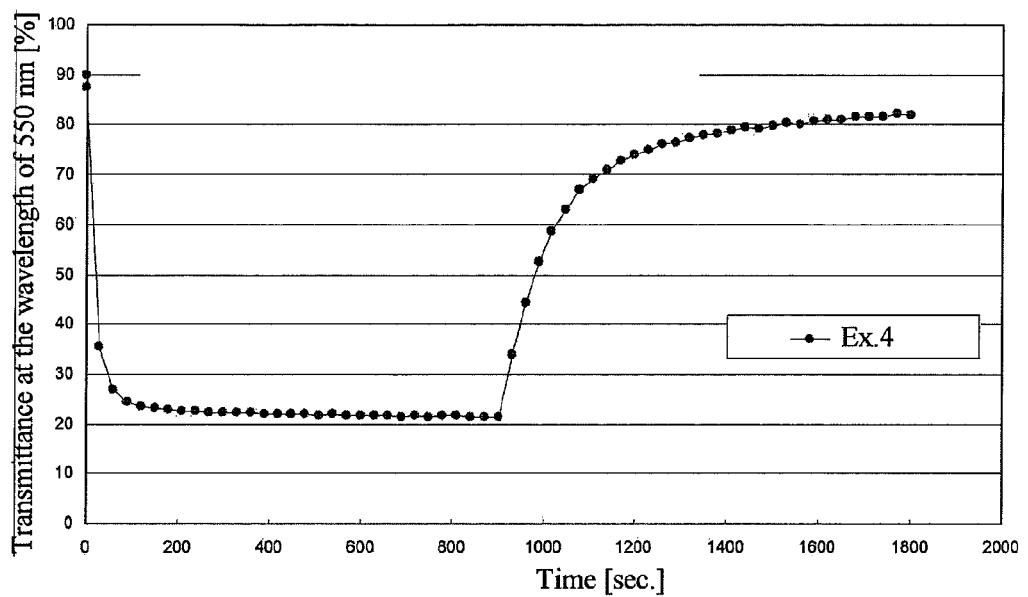

PHOTOCHROMIC FILM, PHOTOCHROMIC LENS COMPRISING THE SAME, AND METHOD OF MANUFACTURING PHOTOCHROMIC LENS

CROSS REFERENCE TO RELATED APPLICATIONS

This application is a National Stage of International Application No. PCT/JP2007/061103 filed May 31, 2007, claiming priority based on Japanese Patent Application Nos. 2006-181073 and 2006-181077 both filed on Jun. 30, 2006, the contents of all of which are incorporated herein by reference in their entirety.

TECHNICAL FIELD

The present invention relates to a photochromic film with excellent light responsiveness and a photochromic lens comprising the same.

The present invention further relates to a method of manufacturing a photochromic lens comprising a photochromic film with excellent light responsiveness.

BACKGROUND TECHNIQUE

In recent years, plastic photochromic lenses employing organic photochromic colorants have been sold for use in eyeglasses. They darken in the bright outdoors, having the same antiglare effect as high-density color lenses, but return to high transmittance when moved indoors.

The methods of providing a coating (photochromic film) containing a photochromic dye on a lens substrate, coating a photochromic film by means of a lens substrate, positioning a photochromic film between two lens substrates, and the like are employed to impart photochromic properties to plastic lenses (for example, see Japanese Unexamined Patent Publication (KOKAI) No. 2005-305306 and the English language family member thereof, US2005/0168690A1, which are expressly incorporated herein by reference in their entirety). The photochromic film employed is required to rapidly darken at high density in response to the entry of prescribed light, and rapidly fade when placed in an environment where this light is absent.

As a method of manufacturing a photochromic lens comprising a structure in which a photochromic film is present on a lens substrate, Japanese Unexamined Patent Publication (KOKAI) Heisei No. 10-231331 and the English language family member thereof, U.S. Pat. No. 5,914,174, which are expressly incorporated herein by reference in their entirety, propose a method (cast polymerization method) by which, in the course of manufacturing a plastic lens by cast polymerization, a coating liquid containing a photochromic dye is precoated on the inner surface of a mold, and curing of the lens is conducted simultaneously with formation of the photochromic film.

The darkening density and response speed of the darkening and fading of a photochromic film are thought to depend on inherent characteristics of the photochromic dye resulting from its molecular structure. Thus, the use of photochromic dyes having specific molecular structures to improve the responsiveness (response speed and darkening density) of a photochromic film to light has been examined.

However, the responsiveness (response speed and darkening density) of a conventional photochromic film to light is not necessarily satisfactory. Further improvement is needed in light responsiveness.

In the manufacturing method described in above-cited Japanese Unexamined Patent Publication (KOKAI) Heisei No. 10-231331, to ensure adhesion between the photochromic layer and the lens substrate, prior to injecting the lens monomer, the photochromic liquid that has been coated on the inner surface of the mold is in an unpolymerized or partially cured state, and once the lens monomer has been injected, the photochromic liquid and lens substrate are sequentially cured. Since this method permits the simultaneous imparting of a photochromic film during curing of the lens substrate, it affords the advantage of excellent workability. However, since the lens substrate and photochromic layer mix together, there is a problem in the form of diminished optical characteristics (clouding, formation of striae) in the lens. Further, the light responsiveness (response speed and darkening density) of the photochromic lens that is obtained by this method is not necessarily satisfactory. Still further improvement is needed in light responsiveness.

DISCLOSURE OF THE INVENTION

Accordingly, the first object of the present invention is to provide a photochromic film with excellent light responsiveness and a photochromic lens comprising the above photochromic film.

Furthermore, the second object of the present invention is to provide a method of manufacturing a photochromic lens with excellent light responsiveness and excellent optical characteristics.

The present inventors conducted extensive research into achieving the above first object.

The response speed and darkening density of the darkening and fading of a photochromic dye in a photochromic film are thought to depend on the inherent characteristics of the photochromic dye resulting from its molecular structure. However, the extensive research conducted by the present inventors has resulted in the following discoveries relating to the light responsiveness of a photochromic film:
(1) By imparting flexibility (fluidity) without fully curing a photochromic film, movement of the dye within the film is facilitated, greatly enhancing the response speed and darkening density of darkening and fading.
(2) Since light responsiveness in a photochromic lens is primarily exhibited in the outer layer portion on the object side (incident light surface side) through which light enters, it is possible to achieve heightened light responsiveness by facilitating movement of at least the dye present in the outer layer portion of the object side of the photochromic lens.

The first aspect of the present invention was devised on the basis of the above discoveries.

That is, the first aspect of the present invention provides a photochromic film comprising a photochromic dye and a resin component, which has a nanoindentation hardness of equal to or greater than 800 nm on at least one of surfaces, surface A, thereof.

According to one embodiment, the surface A is placed on a surface side through which light enters when employed.

According to one embodiment, the surface A has a nanoindentation hardness smaller than that of the other side surface, surface B. The surface B may have a nanoindentation hardness ranging from 500 to 5000 nm. Further, it is preferable that the resin component comprises a cured resin formed by curing a curable component and an uncured curable component, the surface B and a vicinity thereof comprises a main component in the form of the cured resin, a content rate of the cured resin in the surface A and a vicinity thereof is lower than a content rate of the cured resin in the surface B and a vicinity thereof.

According to one embodiment, the curable component is an ultraviolet-curable component.

According to one embodiment, the photochromic film further comprises a hindered amine compound and/or a hindered phenol compound.

The first aspect of the present invention further provides a photochromic lens comprising a photochromic film on a lens substrate. The photochromic film comprised in the of photochromic lens of the first aspect of the present invention is the above photochromic film according to the first aspect of the present invention, and the photochromic film is placed on the lens substrate so that the surface A is positioned on a surface side through which light enters.

According to one embodiment, the photochromic film is placed so that the surface B that is the other surface of the surface A faces a surface of the lens substrate.

According to one embodiment, the lens substrate is a formed article that has been obtained by heating a lens starting material liquid comprising a heat-curable component.

According to one embodiment, the photochromic lens further comprises a hard coating and/or an antireflective film on a surface of the photochromic film, the surface being opposite to the surface facing the surface of the lens substrate.

The present inventors also conducted extensive research into achieving the second above object, resulting in the following discoveries.

As set forth above, research by the present inventors revealed that by imparting flexibility (fluidity) without completely curing a photochromic film, movement of the dye within the film was facilitated, greatly enhancing the response speed and darkening density of darkening and fading.

However, when manufacturing a photochromic lens by the cast polymerization method described in Japanese Unexamined Patent Publication (KOKAI) Heisei No. 10-231331, raising the flexibility (fluidity) of the photochromic film overall causes the lens starting material liquid to mix with the uncured portion of the photochromic film during cast polymerization, compromising optical characteristics.

Accordingly, the present inventors conducted further research, resulting in the discovery that making the photochromic film on the side of the contact surface with the lens substrate harder than on the object side prevented a reduction in the optical characteristics due to mixing at the interface of the lens substrate and the photochromic film in the cast polymerization method, making it possible to ensure light responsiveness in a state facilitating movement of the dye on the object side, and thus yielding a photochromic lens affording excellent light responsiveness and excellent optical characteristics.

The second aspect of the present invention was devised based on the above discovery.

That is, the second aspect of the present invention provides a method of manufacturing a photochromic lens, wherein a photochromic liquid comprising a photochromic dye and a curable component is coated on one surface of a first mold for formation of one of surfaces of a lens, the photochromic liquid is subjected to curing treatment to form a photochromic film having a nanoindentation hardness ranging from 500 to 5000 nm on an outermost surface thereof as well as having a smaller nanoindentation hardness on a surface facing the first mold than that on the outermost surface, the first mold and a second mold for formation of the other surface of the lens are placed so that the outermost surface of the photochromic film faces a surface of the second mold, and a ring-shaped gasket is placed around the two molds to form a cavity with the two molds and the gasket, with the photochromic film being placed within the cavity, a lens starting material liquid comprising a curable component is introduced into the cavity and the curable component is subjected to curing reaction within the cavity to obtain a photochromic lens comprising a photochromic film on a lens surface.

According to one embodiment, the curing treatment is conducted to the extent that a surface of the photochromic film facing the first mold has a nanoindentation hardness within a range of 800 to 5,000 nm According to one embodiment, dry etching treatment with UV ozone or plasma is conducted onto the outermost surface of the photochromic film after formation of the photochromic film but before formation of the cavity.

According to one embodiment, the curable component comprised in the photochromic film is a light-curable component and the curing treatment is conducted by light irradiation. The light irradiation may comprise light irradiation onto the surface of the first mold on which the photochromic liquid has been coated. Further, when the first mold has an optical transparency, the light irradiation may comprise light irradiation, through the first mold, onto the photochromic liquid which has been coated on the first mold. The light irradiated may have a wavelength ranging from 150 to 380 nm. The light irradiation through the first mold may be conducted at an irradiance level lower than that of the light irradiation onto the surface on which the photochromic liquid has been coated. The light irradiation through the first mold may be conducted at an irradiance level ranging from 0.1 to 30 J/cm$^2$, and the light irradiation onto the surface on which the photochromic liquid has been coated may be conducted an irradiance level ranging from 1 to 100 J/cm$^2$.

According to one embodiment, the curable component comprised in the lens starting material liquid is a heat-curable component and the curing reaction is conducted by heating.

According to one embodiment, the lens starting material comprises an ultraviolet absorbing agent.

According to one embodiment, the photochromic liquid comprises a hindered amine compound and/or a hindered phenol compound.

The present invention can provide a photochromic lens having both excellent light responsiveness and excellent optical characteristics.

BEST MODE FOR CARRYING OUT THE INVENTION

The present invention includes a first aspect relating to a photochromic film and a photochromic lens comprising the photochromic film, and a second aspect relating to a method of manufacturing a photochromic lens. The photochromic film, photochromic lens, and method of manufacturing a photochromic lens will be described in detail below.

[Photochromic Film]

The present invention relates to a photochromic film comprising a photochromic dye and a resin component. In the photochromic film of the present invention, the nanoindentation hardness is equal to or greater than 800 nm on at least one of surfaces, surface A, thereof.

The photochromic film of the present invention will be described in detail below.

As set forth above, as a result of examination by the present inventors, it was revealed that imparting suitable flexibility (fluidity) to the photochromic film facilitates movement of the dye within the film, greatly enhancing the response speed and darkening density of darkening and fading. Further, it was also revealed that, since the light responsiveness in the photochromic film is primarily exhibited in the outer layer portion on the object side through which light enters, high light responsiveness could be achieved by facilitating movement of at least the dye present in the outer layer portion on the object side of the photochromic film.

Accordingly, in the photochromic film of the present invention, the nanoindentation hardness of at least one of surfaces, surface A, is equal to or greater than 800 nm. When the nanoindentation hardness of one of the surfaces of the photochromic film is equal to or greater than 800 nm, movement of the photochromic dye can be facilitated in the vicinity of that surface, and thus high light responsiveness can be achieved by placing surface A on the surface side through which light enters.

The greater the nanoindentation hardness of surface A, that is, the greater the flexibility (fluidity) in the vicinity of surface A, the easier it becomes for the photochromic dye to move, which is desirable from the perspective of photochromic properties. However, when surface A becomes excessively flexible, it becomes difficult to maintain the surface shape, mixing may occur at the interface when a coating film is provided on surface A, and there may be a risk of decreased adhesion. From the above perspectives, it is desirable for the nanoindentation hardness of surface A to be equal to or lower than 5,000 nm. The nanoindentation hardness of surface A desirably ranges from 900 to 4,000 nm, preferably equal to or greater than 1,200 nm.

In the photochromic film of the present invention, it suffices for at least one of the surfaces (surface A) to have flexibility in the form of a nanoindentation hardness falling within the above-stated range. It is also naturally possible to impart the same flexibility to the entire photochromic film. However, it is desirable to impart suitable flexibility to surface A and to impart suitable hardness to the other surface (surface B) from the perspective of achieving both light responsiveness and optical characteristics. This point will be described in greater detail below.

FIG. 1 shows an example of a photochromic lens comprising a photochromic film.

The following two methods are examples of methods of manufacturing a lens comprising a photochromic film on a lens substrate such as that shown in FIG. 1.

1. Cast Polymerization Method

This is a method in which cast polymerization is employed to conduct lens substrate curing and formation of a photochromic film on the lens substrate within a forming mold. In this method, a photochromic liquid is coated on one surface of a mold for formation of one of the surfaces of the lens, and the photochromic liquid that has been coated is subjected to curing treatment to form a photochromic film on the surface of the mold. Subsequently, the mold on the surface of which the photochromic film has been formed is used to conduct a lens substrate polymerization reaction.

2. Coating Method

This is a method of coating a coating liquid comprising a photochromic dye on a lens substrate that has been prepared in advance by polymerizing and curing a lens starting material liquid, and curing the coating liquid to obtain a lens with a photochromic film.

When the flexibility (fluidity) of the entire photochromic film is increased during the manufacturing of a lens with a photochromic film by the above cast polymerization method, there may be a risk of the lens starting material liquid and the photochromic film mixing within the forming mold, thereby compromising (clouding, formation of striae) the optical characteristics of the lens. In that case, it is desirable to impart suitable hardness to the surface of the photochromic film on the lens substrate side to prevent mixing at the interface. As set forth above, the light responsiveness of the photochromic film is primarily exhibited in the outer layer portion on the object side through which light enters. Thus, even when the surface of the photochromic film on the lens substrate side is rendered suitably hard, when light enters from the photochromic film side, excellent light responsiveness can be ensured because the light is entering from the side of the surface that has been rendered flexible.

From the above perspectives, the nanoindentation hardness of surface B (in the embodiment in which the photochromic film is placed on the lens substrate, surface B usually faces the lens substrate) on the opposite side from surface A is desirably greater than the nanoindentation hardness of surface A in the photochromic film of the present invention. The nanoindentation hardness of surface B desirably falls within a range of 500 to 5,000 nm. When the nanoindentation hardness of B is equal to or greater than 500 nm, adhesion can be ensured between the substrate and the photochromic film, and when equal to or lower than 5,000 nm, the mixing at the interface between the substrate and the photochromic film that may be occurred in the cast polymerization method can be prevented, ensuring good optical characteristics. The lower limit of the nanoindentation hardness of surface B is preferably 600 nm, more preferably 1,000 nm, and still more preferably, 2,500 nm. The upper limit is preferably 3,500 nm.

In the present invention, the term "nanoindentation hardness" is a value that is measured by applying a load of 100 mgf using an ENT-2100 nanoindentation hardness tester made by Elionix Co., Ltd. The measurement can be conducted as follows. FIG. 2 shows a schematic of the method of measuring nanoindentation hardness.

First, the photochromic film on the lens substrate is peeled off and fixed on a monitor glass so that the surface being measured (surface A or B) is positioned as the outermost surface. Next, a diamond indenter (adjacent edge angle of 115°) having a triangular pyramidal shape is perpendicularly pressed into the surface being measured with a load of 100 mgf, and the displacement (nm) of the film at the time is measured. In the present invention, such displacement (nm) is employed as the nanoindentation hardness. The smaller the numerical value, the greater the hardness. The larger the numerical value, the lower the hardness, indicating flexibility.

The hardness (flexibility) of the outer layer portion of the surface being measured can be evaluated based on the nanoindentation hardness. Similarly, the indentation hardness, Martens hardness, and compound Young's modulus are also known indexes of outer layer portion hardness.

The indentation hardness, specified by ISO 14577, is a value that is obtained from the displacement-load curve from when the indenter is loaded to when it is unloaded. As when measuring the nanoindentation hardness, an ENT-2100 nanoindentation hardness tester made by Elionix Co., Ltd. is employed, the indentation depth h (nm) corresponding to the indentation load P (mgf) is continuously measured over the entire process from the start of loading to unloading, and a P-h curve is prepared. The indentation hardness H can be obtained from the P-h curve thus prepared using equation (1) below:

$$H(\mathrm{mgf}/\mu m^2) = P\mathrm{max}/A \tag{1}$$

[Pmax: maximum load (mgf), A: projected area of indenter (μm$^2$)

The compound Young's modulus E*(mgf/μm$^2$) can be obtained from the above P-h curve using equation (2).

[Numeral 1]

$$E^* = \frac{\sqrt{\pi}}{2\sqrt{A}\left[\frac{dh}{dP}\right]_{P_{max}}} \quad (2)$$

[P: load (mgf), Pmax: maximum load (mgf), A: projected area of indenter (μm$^2$), h: indentation depth (nm)]

Martens hardness is also specified by ISO 14577. The Martens hardness, defined as the force F divided by the surface area As of the indenter penetrating beyond the original surface when a force F is applied to press the indenter to a prescribed indentation depth h, includes the two components of plasticity and elastic deformation. It is the hardness measured while the test load is being applied, and can be obtained from the value of the load-indentation depth curve when the load is increased. The measurement can be conducted with the above-described ENT-2100 nanoindentation hardness tester made by Elionix Co., Ltd.

Expressed as an indentation hardness, the hardness (flexibility) of the above photochromic film is desirably equal to or greater than 0.5, preferably 1.2 to 10, for surface A and desirably equal to or greater than 1.0, preferably 1.5 to 20 for surface B. When expressed as a compound Young's modulus, it is desirably equal to or greater than 1.0, preferably 3 to 150, for surface A and desirably equal to or greater than 3.0, preferably 6 to 300 for surface B. Expressed as a Martens hardness, it is desirably equal to or greater than 0.1, preferably 0.2 to 5, for surface A and desirably equal to or greater than 0.3, preferably 0.5 to 10 for surface B.

The above photochromic film can be formed by subjecting a coating liquid for forming a photochromic film (also referred to as a "photochromic liquid", hereinafter) comprising a photochromic dye and a curable component to curing treatment. The flexibility (nanoindentation hardness of each surface) of the photochromic film can be controlled by means of: (1) the composition of the photochromic liquid, (2) the curing conditions, and (3) the thickness of the photochromic film. (1) to (3) above are described in detail further below.

Examples of embodiments in which the photochromic film of the present invention is used are: an embodiment in which it is laminated on a lens substrate, an embodiment in which it is coated by a lens substrate, and an embodiment in which it is sandwiched between two lens substrates. In each of these use embodiments, excellent light responsiveness can be achieved by placing the surface having a nanoindentation hardness of equal to or greater than 800 nm on the surface side through which light enters.

The details of desirable use embodiments, compositions, manufacturing methods, and the like of the photochromic film of the present invention are as set forth further below for the photochromic lens of the present invention and the method of manufacturing a photochromic lens of the present invention.

[Photochromic Lens]

The present invention relates to a photochromic lens comprising a photochromic film on a lens substrate. In the photochromic lens of the present invention, the photochromic film of the present invention is placed on the lens substrate so that it is positioned on a surface side through which light enters. As set forth above, flexibility (fluidity) is suitably imparted to at least one surface (surface A) of the photochromic film of the present invention. The photochromic lens of the present invention can exhibit excellent light responsiveness due to surface A being placed on the surface side through which light enters. The nanoindentation hardness of each surface of the photochromic film is as set forth above.

In a photochromic lens having a configuration in which a photochromic film is laminated on a lens substrate such as that shown in FIG. 1, light normally enters from the photochromic film side. Thus, in this case, surface B on the opposite side from surface A (the entry surface side) faces the surface of the lens substrate.

As described above, the flexibility (nanoindentation hardness) of the photochromic film can be controlled by adjusting the hardness of the photochromic film. As set forth above, the hardness of the photochromic film can be controlled by: (1) the composition of the photochromic liquid, (2) the curing conditions, and (3) the thickness of the photochromic film. The above (1) to (3) will be described in turn below.

(1) Photochromic Liquid

The photochromic liquid can be prepared from curable components, photochromic dyes, polymerization initiators, and optional additives. Each of these components is described below.

(i) Curable Components

The curable components that can be employed to prepare the photochromic film are not specifically limited. Known photopolymerizable monomers and oligomers, and their prepolymers, having radical polymerizable groups such as (meth)acryloyl groups, (meth)acryloyloxy groups, vinyl groups, allyl groups, and styryl groups, can be employed. Of these, compounds having a radical polymerizable group in the form of a (meth)acryloyl group or (meth)acryloyloxy group are desirable because of availability and ease of curing. The (meth) acryloyl denotes both acryloyl and methacryloyl.

To prevent mixing at the interface between the photochromic film and the lens substrate, facilitate hardness adjustment, achieve good solvent resistance and hardness following film formation, achieve good cured product characteristics such as heat resistance, and achieve good photochromic characteristics such as darkening density and fading speed, a radical polymerizable monomer exhibiting a Rockwell L scale hardness of equal to or higher than 60 (also sometimes referred to as a "high-hardness monomer", hereinafter) as a homopolymer and a radical polymerizable monomer exhibiting a Rockwell L scale hardness of equal to or lower than 40 (also sometimes referred to as a "low-hardness monomer", hereinafter) as a homopolymer are preferably employed in combination.

The "Rockwell L scale hardness" refers to the hardness as measured according to JIS-B7726. Whether or not the above hardness condition is satisfied can be simply determined by conducting measurement of the homopolymers of the individual monomers. Specifically, the monomer is polymerized to obtain a cured product 2 mm in thickness. This is then maintained for one day indoors at 25° C. A Rockwell hardness meter is then employed to measure the Rockwell L scale hardness, permitting ready confirmation.

The polymer that is used in the measurement of the Rockwell L scale hardness is obtained by conducting cast polymerization under conditions where 90 percent or more of the polymerizable groups of the charged monomer polymerize.

The Rockwell L scale hardness of a cured product that has been polymerized under such conditions will give measurements of nearly constant value.

The high-hardness monomer has the effect of enhancing the solvent resistance, hardness, and heat resistance of the cured product. A radical polymerizable monomer exhibiting a Rockwell L scale hardness of 65 to 130 as a homopolymer is desirable to effectively achieve the above effects.

Such a high-hardness monomer is normally a compound having 2 to 15, desirably 2 to 6, radical polymerizable groups. Specific desirable examples are the compounds denoted by general formulas (1) to (5) below:

[Chem. 1]

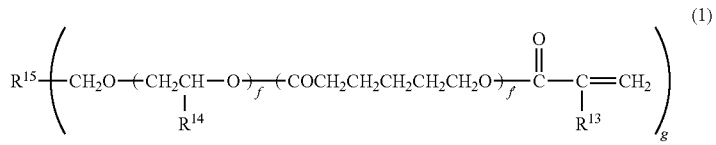

(1)

(In the formula, $R^{13}$ is a hydrogen atom or methyl group, $R^{14}$ is a hydrogen group, methyl group or ethyl group, $R^{15}$ is a trivalent to hexavalent organic group, f is an integer ranging from 0 to 3, f' is an integer ranging from 0 to 3, and g is an integer ranging from 3 to 6.)

[Chem. 2]

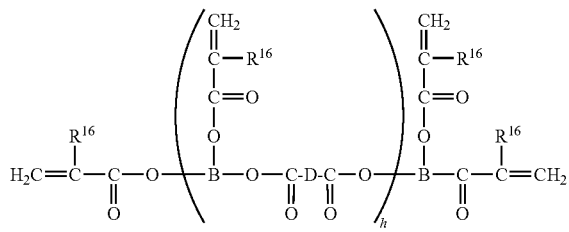

(2)

(In the formula, $R^{16}$ is a hydrogen atom or methyl group, B is a trivalent organic group, D is a divalent organic group, an h is an integer ranging from 1 to 10.)

[Chem. 3]

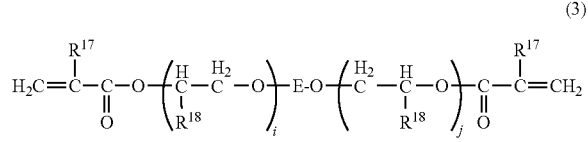

(3)

(In the formula, $R^{17}$ is a hydrogen atom or methyl group, $R^{18}$ is a methyl group, ethyl group or hydroxyl group, E is a divalent group comprising a cyclic group, and i and j are positive integers with an average value of i+j of 0 to 6.)

[Chem. 4]

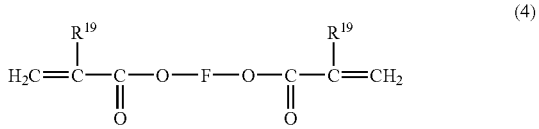

(4)

(In the formula, $R^{19}$ is a hydrogen atom or methyl group, and F is an alkylene group having 2 to 9 carbon atoms on the main chain thereof and optionally having a side chain.)

[Chem. 5]

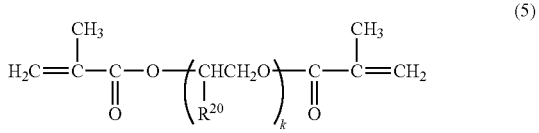

(5)

(In the formula, $R^{20}$ is a hydrogen atom, methyl group or ethyl group, and k is an integer ranging from 1 to 6.)

In general formulas (1) to (4) above, each of $R^{13}$ to $R^{19}$ is a hydrogen atom or a methyl group. Thus, the compounds denoted by general formulas (1) to (4) comprise 2 to 6 (meth) acryloyloxy groups.

In general formula (1), $R^{14}$ is a hydrogen atom, methyl group, or ethyl group.

In general formula (1), $R^{15}$ is a trivalent to hexavalent organic group. The organic group is not specifically limited, and may comprise on the main chain thereof a bond other than a carbon-carbon bond, such as an ester bond, ether bond, amide bond, thioether bond, sulfonyl bond, or urethane bond.

To exhibit a Rockwell L scale hardness of equal to or higher than 60 as a homopolymer, $R^{15}$ is desirably an organic group having 1 to 30 carbon atoms, preferably an organic group having 1 to 15 carbon atoms, optionally comprising an ether bond and/or a urethane bond.

Each of f and f' is independently an integer falling within a range of 0 to 3. To achieve a Rockwell L scale hardness of equal to or higher than 60, the sum of f and f' is desirably 0 to 3.

Specific examples of the high-hardness monomer denoted by the above general formula (1) are: trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropane triethylene glycol trimethacrylate, trimethylolpropane triethyleneglycol triacrylate, ethoxylated pentaerythritol tetraacrylate, ethoxylated pentaerythritol tetramethacrylate, pentaerythritol trimethacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, caprolactone-modified dipentaerythritol hexaacrylate, and ditrimethylolpropane tetraacrylate.

In the above general formula (2), B is a trivalent organic group and D is a divalent organic group. The B and D are not specifically limited, and may comprise in the main chains thereof a bond other than a carbon-carbon bond, such as an ester bond, ether bond, amide bond, thioether bond, sulfonyl bond, or urethane bond. To achieve a Rockwell L scale hardness of equal to or higher than 60 as a homopolymer, B is desirably an organic group derived from a linear or branched hydrocarbon having 3 to 10 carbon atoms, and D is desirably an organic group derived from an aliphatic linear or branched chain hydrocarbon having 1 to 10 carbon atoms or an aromatic hydrocarbon having 6 to 10 carbon atoms.

To achieve a Rockwell L scale hardness of equal to or higher than 60 as a homopolymer, h is an integer ranging from 1 to 10, desirably an integer ranging from 1 to 6.

Specific examples of high-hardness monomers denoted by the above general formula (2) are: tetrafunctional polyester oligomers with a molecular weight of 2,500 to 3,500 (such as EB80, Daicel UCB Co., Ltd.); tetrafunctional polyester oligomers with a molecular weight of 6,000 to 8,000 (such as EB450, Daicel UCB Co., Ltd.); hexafunctional polyester oligomers with a molecular weight of 45,000 to 55,000 (such as EB1830, Daicel UCB Co., Ltd.), and tetrafunctional polyester oligomers with a molecular weight of 10,000 (such as GX8488B, DAI-ICHI KOGYO SEIYAKU CO., LTD.).

In the above general formula (3), $R^{18}$ is a hydrogen atom, methyl group, ethyl group, or hydroxyl group. In general formula (3), E denotes a divalent organic group comprising a cyclic group. The organic group is not specifically limited other than that it comprises a cyclic group, and may comprise a bond other than a carbon-carbon bond, such as an ester bond, ether bond, amide bond, thioether bond, sulfonyl group, or urethane bond in the main chain thereof. Examples of the cyclic group comprised in E are benzene rings, cyclohexane rings, adamantane rings, and the cyclic groups indicated below.

[Chem. 6]

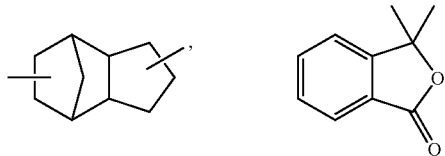

The cyclic group comprised in E is preferably a benzene ring, and E is more preferably a group denoted by the following formula:

[Chem. 7]

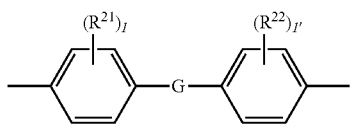

(wherein G is any of groups selected from a oxygen atom, sulfur atom, —S(O$_2$)—, —C(O)—, —CH$_2$—, —CH=CH—, —C(CH$_3$)$_2$—, and —C(CH$_3$)(C$_6$H$_5$)—, each of $R^{21}$ and $R^{22}$ is independently an alkyl group having 1 to 4 carbon atoms or a halogen atom, and each of l and l' is independently an integer ranging from 0 to 4), and the most preferable E is a group denoted by the following formula:

[Chem. 8]

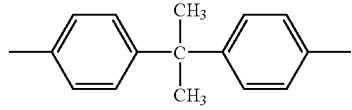

In the above general formula (3), i and j denote positive integers with an average value of i+j of 0 to 6. The compound denoted by general formula (3), excluding the case where both i and j are 0, can normally be obtained as a mixture of multiple compounds of differing i and j. Since they are difficult to isolate, i and j are indicated as an average value of i+j. The average value of i+j is preferably 2 to 6.

Specific examples of the high-hardness monomer denoted by general formula (3) are bisphenol A dimethacrylate, 2,2-bis(4-methacryloyloxyethoxyphenyl)propane, and 2,2-bis(3,5-dibromo-4-methacryloyloxyethoxyphenyl)propane.

In the above general formula (4), $R^{19}$ is a hydrogen atom or a methyl group, and F is an alkylene group having 2 to 9 carbon atoms on the main chain thereof and optionally having a side chain. Examples of the alkylene group having 2 to 9 carbon atoms on the main chain thereof are: ethylene, propylene, trimethylene, butylene, neopentylene, hexylene, and nonylylene groups.

Specific examples of the high-hardness monomer denoted by general formula (4) are ethylene glycol diacrylate, ethylene glycol dimethacrylate, 1,4-butylene glycol dimethacrylate, 1,9-nonylene glycol dimethacrylate, neopentylene glycol dimethacrylate, and neopentylene glycol diacrylate.

In the above general formula (5), $R^{20}$ is a hydrogen atom, methyl group, or ethyl group, and k is an integer ranging from 2 to 6, desirably 3 or 4.

Specific examples of the high-hardness monomer denoted by general formula (5) are: diethylene glycol dimethacrylate, triethylene glycol dimethacrylate, tetraethylene glycol dimethacrylate, tripropylene glycol dimethacrylate, and tetrapropylene glycol dimethacrylate.

Depending on the combination of substituent, some of the compounds denoted by the above general formulas (1) to (5) may become a homopolymer with a Rockwell L scale hardness of less than 60. In such cases, these compounds are classified as the low-hardness monomers or medium-hardness monomers described further below.

There are also high-hardness monomers that are not denoted by the above general formulas (1) to (5). Typical examples of such compounds are: bisphenol A diglycidyl methacrylate, ethylene glycol bisglycidyl methacrylate, and glycidyl methacrylate.

The above-described low-hardness monomers have the effect of increasing the toughness of the cured products and increasing the fading speed of the photochromic compound.

Examples of such low-hardness monomers are bifunctional monomers denoted by the following general formula (6) or (7) and monofunctional monomers denoted by the following formula (8) or (9):

[Chem. 9]

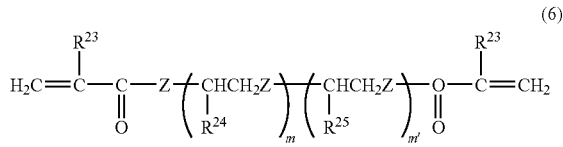

(6)

(In the formula, $R^{23}$ is a hydrogen atom or methyl group, each of $R^{24}$ and $R^{25}$ is independently a hydrogen atom, methyl group or ethyl group, Z is an oxygen atom or sulfur atom, m is an integer ranging from 1 to 70 when $R^{23}$ is a hydrogen atom, or m is an integer ranging from 7 to 70 when $R^{23}$ is a methyl group, and m' is an integer ranging from 0 to 70.)

[Chem. 10]

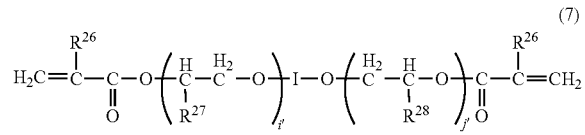

(7)

(In the formula, $R^{26}$ is a hydrogen atom or methyl group, each of $R^{27}$ and $R^{28}$ is independently a hydrogen atom, methyl group, ethyl group or hydroxyl group, I is a divalent organic group comprising a cyclic group, and I' and j' denote positive integers with an average value of I'+j' of 8 to 40.)

[Chem. 11]

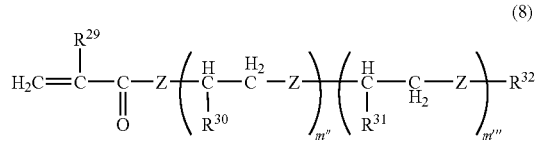

(8)

(In the formula, $R^{29}$ is a hydrogen atom or methyl group, each of $R^{30}$ and $R^{31}$ is independently a hydrogen atom, methyl group or ethyl group, $R^{32}$ is a hydrogen atom; an alkyl group, alkenyl group, alkoxyalkyl group, or haloalkyl group having 1 to 25 carbon atoms; an aryl group having 6 to 25 carbon atoms; or an acyl group having 2 to 25 carbon atoms other than an acryloyl group, Z is an oxygen atom or sulfur atom, m" is an integer ranging from 1 to 70 when $R^{29}$ is a hydrogen atom, or m" is an integer ranging from 4 to 70 when $R^{29}$ is a methyl group, and m'" is an integer ranging from 0 to 70.)

[Chem. 12]

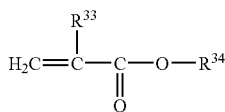

(9)

(In the formula, $R^{33}$ is a hydrogen atom or methyl group, $R^{34}$ is an alkyl group having 1 to 20 carbon atoms when $R^{33}$ is a hydrogen atom, or $R^{34}$ is an alkyl group having 8 to 40 carbon atoms when $R^{33}$ is a methyl group.)

In general formulas (6) to (9), $R^{23}$, $R^{26}$, $R^{29}$, and $R^{33}$ are hydrogen atoms or methyl groups. That is, the low-hardness monomer comprises a polymerizable group in the form of, normally, two or fewer (meth)acryloyloxy groups or (meth)acryloylthio groups.

In the above general formula (6), each of $R^{24}$ and $R^{25}$ is independently a hydrogen atom, methyl group, or ethyl group, and Z is an oxygen atom or sulfur atom.

In general formula (6), when $R^{23}$ is a hydrogen atom, that is, when the polymerizable group is present in the form of an acryloyloxy group or acryloylthio group, m is an integer ranging from 1 to 70. When $R^{23}$ is a methyl group, that is, when the polymerizable group is present in the form of a methacryloyloxy group or methacryloylthio group, m is an integer ranging from 7 to 70. m' is an integer falling within a range of 0 to 70.

Specific examples of the low-hardness monomer denoted by general formula (6) are alkylene glycol di(meth)acrylates such as trialkylene glycol diacrylate, tetralkylene glycol diacrylate, nonylalkylene glycol diacrylate, and nonylalkylene glycol dimethacrylate.

In the above general formula (7), $R^{26}$ is a hydrogen atom, methyl group, or ethyl group.

Further, I is a divalent organic group comprising a cyclic group. Examples of such I are the same as those given for the cyclic group E comprised in general formula (9). In general formula (7), i' and j' are integers such that the average value of i'+j' is 8 to 40, desirably 9 to 30. For the same reason as that given for i and j in general formula (3) above, i' and j' are normally given as an average.

Specific examples of the low-hardness monomer denoted by general formula (7) are 2,2-bis(4-acryloyloxypolyethyleneglycolphenyl)propane having an average molecular weight of 776, and the like.

In the above general formula (8), $R^{29}$ is a hydrogen atom or methyl group. Each of $R^{30}$ and $R^{31}$ is independently a hydrogen atom, methyl group, or ethyl group. $R^{32}$ is a hydrogen atom; an alkyl group, alkenyl group, alkoxyalkyl group, or haloalkyl group having 1 to 25 carbon atoms; an aryl group having 6 to 25 carbon atoms; or an acyl group having 2 to 25 carbon atoms other than an acryloyl group.

Examples of alkyl groups and alkenyl groups having 1 to 25 carbon atoms are methyl groups, ethyl groups, propyl groups, and nonyl groups. The alkyl group or alkenyl group may be linear or branched, and may be substituted with substituent such as halogen atoms, hydroxyl groups, aryl groups, or epoxy groups.

Examples of alkoxyalkyl groups having 1 to 25 carbon atoms are methoxybutyl groups, ethoxybutyl groups, butoxybutyl groups, and methoxynonyl groups.

Examples of aryl groups having 6 to 25 carbon atoms are phenyl groups, toluoyl groups, anthranyl groups, and octylphenyl groups. Examples of acryl groups other than (meth)acryloyl groups are acetyl groups, propionyl groups, butyryl groups, valeryl groups, and oleyl groups.

In general formula (8), when $R^{29}$ is a hydrogen atom, that is, when an acryloyloxy group or acryloylthio group is present as a polymerizable group, m" denotes an integer ranging from 1 to 70. When $R^{29}$ is a methyl group, that is, when a methacryloyloxy group or methacryloylthio group is present as a polymerizable group, m" denotes an integer ranging from 4 to 70. m'" denotes an integer ranging from 0 to 70.

Specific examples of the low-hardness monomer denoted by general formula (8) are polyalkylene glycol (meth)acrylates such as polyethylene glycol methacrylate with an average molecular weight of 526, polyethylene glycol methacrylate with an average molecular weight of 360, methyl ethyl polyethylene glycol methacrylate with an average molecular weight of 475, methyl ether polyethylene glycol methacrylate with an average molecular weight of 1,000, polypropylene glycol methacrylate with an average molecular weight of 375, polypropylene methacrylate with an average molecular weight of 430, polypropylene methacrylate with an average molecular weight of 622, methyl ether polypropylene glycol methacrylate with an average molecular weight of 620, polytetramethylene glycol methacrylate with an average molecular weight of 566, octyl phenyl ether polyethylene glycol methacrylate with an average molecular weight of 2,034, nonyl ether polyethylene glycol methacrylate with an average molecular weight of 610, methyl ether polyethylenethioglycol methacrylate with an average molecular weight of 640, and perfluoroheptylethylene glycol methacrylate with an average molecular weight of 498. The average molecular weight of the low-hardness monomer denoted by general formula (8) desirably falls within a range of 200 to 2,500, preferably 300 to 700. The average molecular weight given in the present invention is the mass average molecular weight.

In general formula (9), $R^{33}$ is a hydrogen atom or methyl group. When $R^{33}$ is a hydrogen atom, $R^{34}$ is an alkyl group having 1 to 20 carbon atoms. When $R^{33}$ is a methyl group, $R^{34}$ is an alkyl group having 8 to 40 carbon atoms. These alkyl groups may be linear or branched, and may be substituted with substituent such as halogen atoms, hydroxyl groups, alkoxyl groups, acyl groups, and epoxy groups.

Specific examples of the low-hardness monomer denoted by general formula (9) are stearyl methacrylate, lauryl methacrylate, ethyl hexyl methacrylate, methyl acrylate, ethyl acrylate, butyl acrylate, and lauryl acrylate.

Among the low-hardness monomers denoted by general formulas (6) to (9), the following are preferred: methyl ethyl polyethylene glycol methacrylate having an average molecular weight of 475, methyl ether polyethylene glycol methacrylate having an average molecular weight of 1,000, trialkylene glycol diacrylate, tetraalkylene glycol diacrylate, nonylalkylene glycol diacrylate, methyl acrylate, ethyl acrylate butyl acrylate, and lauryl acrylate.

Among the compounds denoted by general formulas (6) to (9), some may have a Rockwell L scale hardness of equal to or higher than 40 as a homopolymer depending on the combination of substituent. In such cases, these compounds are classified as the above high-hardness monomer or as a medium hardness monomer, described further below.

Examples of monomers that are neither the above high-hardness monomer nor a low-hardness monomer, that is monomers the single cured product of which exhibit a Rockwell L scale hardness of greater than 40 but less than 60 (sometimes referred to as "medium-hardness monomers") are: bifunctional (meth)acrylates such as polytetramethylene glycol dimethacrylate having an average molecular weight of 650, polytetramethylene glycol dimethacrylate having an average molecular weight of 1,400, and bis(2-methacryloyloxyethylthioethyl)sulfide; polyvalent allyl compounds such as diallyl phthalate, diallyl isophthalate, diallyl tartrate, diallyl epoxysuccinate, diallyl fumarate, diallyl chlorendate, diallyl hexaphthalate, and allyl diglycol carbonate; polyvalent thioacrylic acid and polyvalent thiomethacrylic acid ester compounds such as 1,2-bis(methacryloylthio)ethane, bis(2-acryloylthioethyl)ether, and 1,4-bis(meth-acryloylthiomethyl)benzene; unsaturated carboxylic acids such as acrylic acid, methacrylic acid, and maleic anhydride; acrylic acid and methacrylic acid ester compounds such as ethyl methacrylate, butyl methacrylate, benzyl methacrylate, phenyl methacrylate, 2-hydroxyethyl methacrylate, and biphenyl methacrylate; fumaric acid ester compounds such as diethyl fumarate and diphenyl fumarate; thioacrylic acid and thiomethacrylic acid ester compounds such as methyl thioacrylate, benzyl thioacrylate, and benzyl thiomethacrylate; vinyl compounds such as styrene, chlorostyrene, methyl styrene, vinyl naphthalene, α-methylstyrene dimer, bromostyrene, divinyl benzene, and vinyl pyrrolidone; and radical polymerizable monofunctional monomers such as (meth)acrylates having hydrocarbon chains with 6 to 25 carbon atoms having intramolecular unsaturated bonds such as oleyl methacrylate, nerol methacrylate, geraniol methacrylate, linalool methacrylate, and farnesol methacrylate.

These medium-hardness monomers can also be employed; the above-described high-hardness monomers, low-hardness monomers, and medium-hardness monomers can be suitably mixed for use. To achieve a good balance between the solvent-resistant characteristic of the cured product of curable composition; cured product characteristics such as hardness and heat resistance; and photochromic characteristics such as darkening density and fading speed, the proportion in the above-described radical polymerizable monomer is desirably 5 to 70 weight percent low-hardness monomer and 5 to 95 weight percent high-hardness monomer. A monomer having three or more radical polymerizable groups is preferably blended in as the high-hardness monomer in a proportion of at least 5 weight percent or higher among the radical polymerizable monomers.

(ii) Photochromic Dye

Known photochromic dyes can be added to the photochromic liquid. Examples are photochromic compounds such as fulgimide compounds, spiro-oxazine compounds, and chromene compounds. These photochromic compounds can be employed without specific limitation in the present invention.

For example, the compounds described in Japanese Unexamined Patent Publication (KOKAI) Heisei No. 2-28154, Japanese Unexamined Patent Publication (KOKAI) Showa No. 62-288830, the Specification of No. WO94/22850, and the Specification of No. WO96/14596, which are expressly incorporated herein by reference in their entirety, can suitably employed as the above fulgimide compounds, spiro-oxazine compounds, and chromene compounds.

The compounds disclosed in Japanese Unexamined Patent Publication (KOKAI) Nos. 2001-114775, 2001-031670, 2001-011067, 2001-011066, 2000-347346, 2000-34476, 2000-3044761, 2000-327676, 2000-327675, 2000-256347, 2000-229976, 2000-229975, 2000-229974, 2000-229973, 2000-229972, 2000-219687, 2000-219686, and 2000-219685; and Japanese Unexamined Patent Publication (KOKAI) Heisei Nos. 11-322739, 11-286484, 11-279171, 10-298176, 09-218301, 09-124645, 08-295690, 08-176139, and 08-157467 are suitably employed as compounds having excellent photochromic properties. The contents of the above-cited publications are expressly incorporated herein by reference in their entirety.

Of these photochromic compounds, the use of chromene-based photochromic compounds is particularly desirable because the durability of their photochromic characteristics is particularly greater than that of other photochromic compounds, and the enhancement in photochromic characteristics such as darkening density and fading speed is greater than in other photochromic compounds. Among these chromene-based photochromic compounds, those having a molecular weight of equal to or greater than 540 are suitably employed because the improvement in photochromic characteristics by the present invention, such as darkening density and fading speed, is particularly pronounced relative to other chromene-based photochromic compounds.

The compound denoted by general formula (12) below is desirable as a chromene compound because it affords particularly good photochromic characteristics such as darkening density, fading speed, and durability:

[Chem. 13]

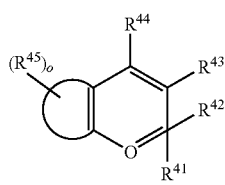

(12)

[In the formula, the group denoted by general formula (13) below:

[Chem. 14]

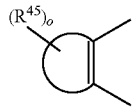

(13)

is a substituted or unsubstituted aromatic hydrocarbon group or a substituted or unsubstituted unsaturated heterocyclic group; each of $R^{43}$, $R^{44}$, and $R^{45}$ is independently a hydrogen atom, alkyl group, alkoxyl group, aralkoxy groups, amino group, substituted amino group, cyano group, substituted or unsubstituted aryl group, halogen atom, aralkyl group, hydroxyl group, substituted or unsubstituted alkynyl group, substituted or unsubstituted heterocyclic group having a hetero atom in the form of a nitrogen atom which is bonded to a pyran ring or the ring of the group denoted by general formula (13) above, or a condensed heterocyclic group in which an aromatic hydrocarbon ring or an aromatic heterocycle is condensed with the above heterocyclic group; and o denotes an integer falling within a range of 0 to 6. Each of $R^{41}$ and $R^{42}$ is independently the group denoted by general formula (14) below:

[Chem. 15]

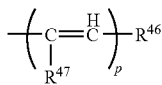

(14)

(wherein $R^{46}$ is a substituted or unsubstituted aryl group or a substituted or unsubstituted heteroaryl group, $R^{47}$ is a hydrogen atom, alkyl group, or halogen atom; and p is an integer ranging from 1 to 3), the group denoted by general formula (15) below:

[Chem. 16]

(15)

(wherein $R^{48}$ is a substituted or unsubstituted aryl group or substituted or unsubstituted heteroaryl group and p' is an integer ranging from 1 to 3), a substituted or unsubstituted aryl group, a substituted or unsubstituted heteroaryl group, or an alkyl group. Alternatively, $R^{41}$ and $R^{42}$ may be joined to form an aliphatic hydrocarbon ring or an aromatic hydrocarbon ring.]

Examples of the substituent in the substituted aryl groups and substituted heteroaryl groups described for $R^{41}$, $R^{42}$, and general formulas (14) and (15) are the same groups as for $R^{43}$ and $R^{44}$ above.

From the perspective of photochromic characteristics such as darkening density and fading speed, as well as durability, the compounds denoted by general formulas (16) to (21) below are particularly well-suited among the chromene compounds denoted by general formula (12).

[Chem. 17]

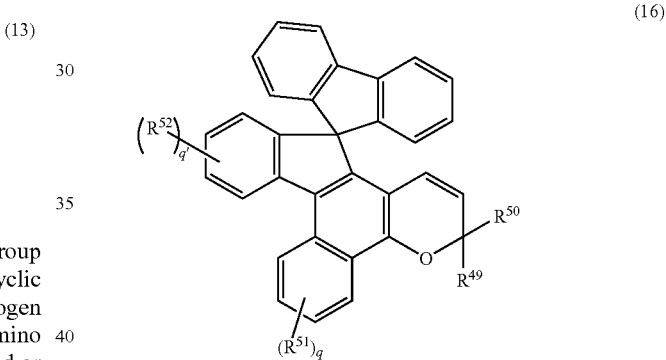

(16)

(In the Formula, Each of $R^{49}$ and $R^{50}$ is the Same as $R^{41}$ and $R^{42}$ in General Formula (12) above, each of $R^{51}$ and $R^{52}$ is the same as $R^{45}$ in general formula (12) above, and each of q and q' is 1 or 2.)

[Chem. 18]

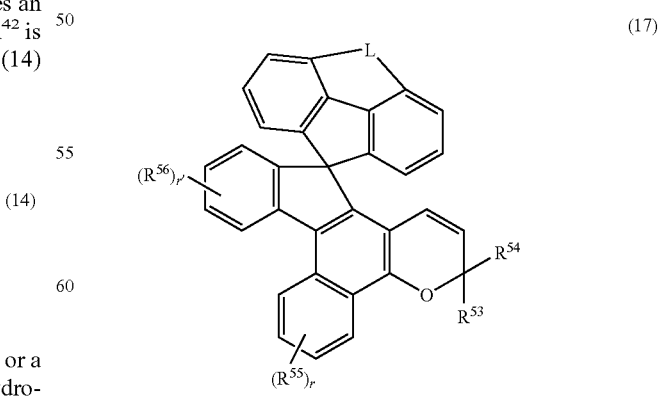

(17)

{In the formula, each of $R^{53}$ and $R^{54}$ is the same as $R^{41}$ and $R^{42}$ in general formula (12) above, each of $R^{55}$ and $R^{56}$ is the same as R$^{45}$ in general formula (12) above, L is any of groups denoted by the following formulas:

[Chem. 19]

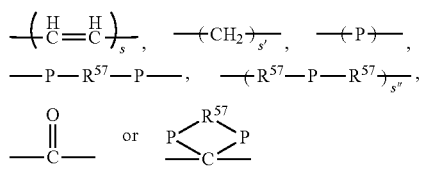

(wherein P is an oxygen atom or sulfur atom, R$^{57}$ is an alkylene group having 1 to 6 carbon atoms, all of s, s' and s''' are integers ranging from 1 to 4), and each of r and r' is independently 1 or 2.}

[Chem. 20]

(18)

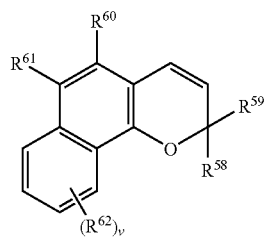

(In the Formula, each of R$^{58}$ and R$^{59}$ is the Same as R$^{41}$ and R$^{42}$ in General Formula (12) above, each of R$^{60}$, R$^{61}$ and R$^{62}$ is the same as R$^{45}$ in general formula (12) above, and v is 1 or 2.)

[Chem. 21]

(19)

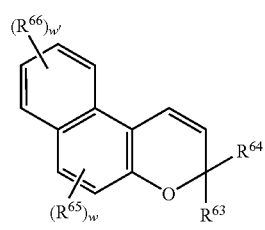

(In the Formula, each of R$^{63}$ and R$^{64}$ is the Same as R$^{41}$ and R$^{42}$ in General Formula (12) above, each of R$^{65}$ and R$^{66}$ is the same as R$^{45}$ in general formula (12) above, each of w and w' is independently 1 or 2.)

[Chem. 22]

(20)

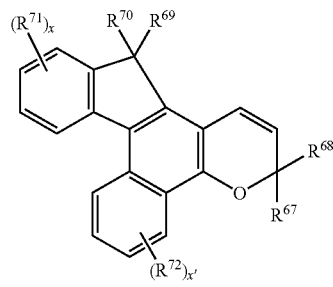

(In the Formula, each of R$^{67}$ and R$^{68}$ is the Same as R$^{41}$ and R$^{42}$ in General Formula (12) above, each of R$^{69}$, R$^{70}$, R$^{71}$ and R$^{72}$ is the same as R$^{45}$ in general formula (12) above, and each of x and x' is independently 1 or 2.)

[Chem. 23]

(21)

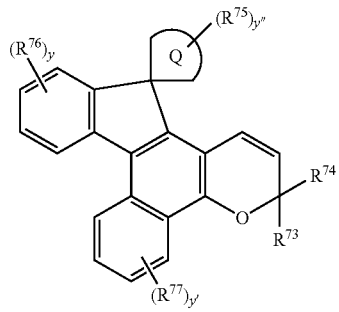

(In the Formula, each of R$^{73}$ and R$^{74}$ is the Same as R$^{41}$ and R$^{42}$ in General Formula (12) above, each of R$^{75}$, R$^{76}$ and R$^{77}$ is the same as R$^{45}$ in general formula (12) above,

[Chem. 24]

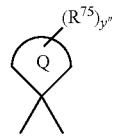

is a aliphatic hydrocarbon ring optionally comprising at least one substituent, and each of y, y' and y'' is independently 1 or 2.]

Among the chromene compounds denoted by general formulas (16) to (21) above, chromene compounds with the following structures are particularly preferred.

[Chem. 25]

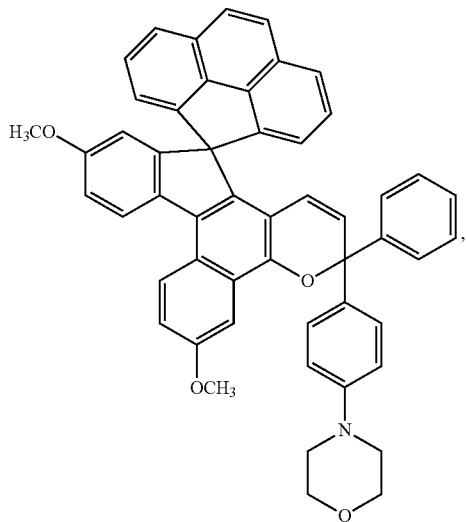

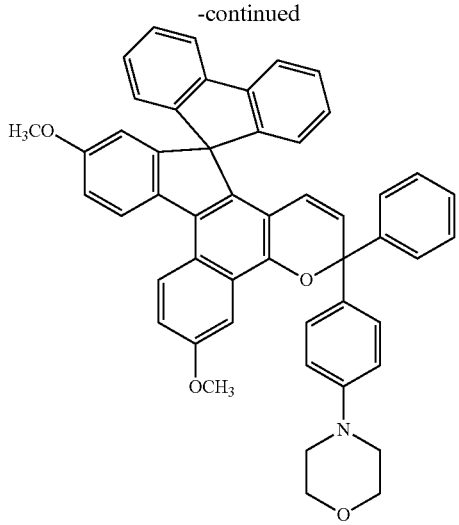

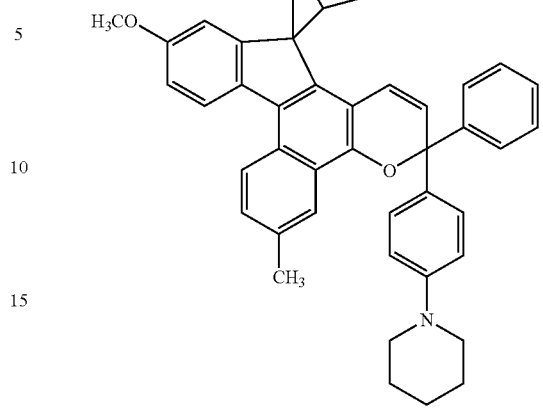

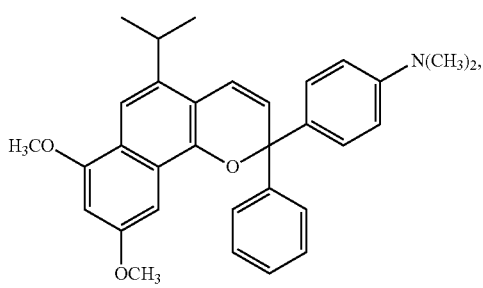

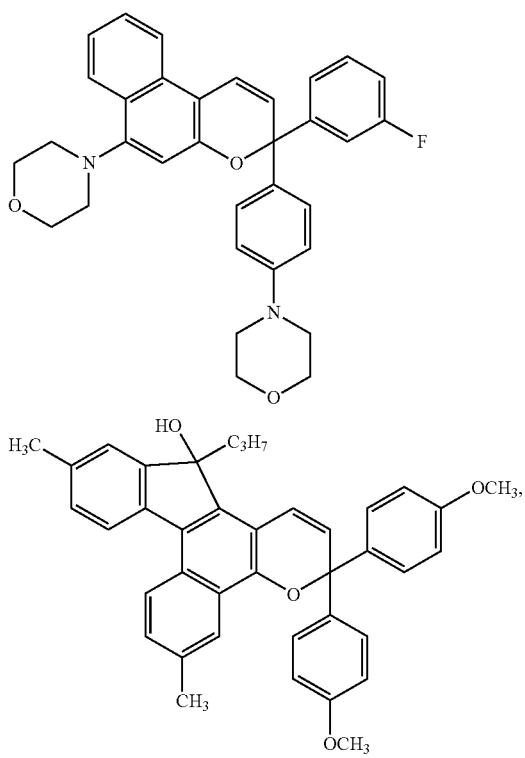

More than one of these photochromic compounds can be suitably mixed for use to exhibit suitable darkening tones.

In the present invention, the state of curing of the photochromic film can be controlled based on the photochromic dye concentration in the photochromic liquid. When conducting a curing reaction in the form of photopolymerization and irradiating light for polymerization, the photochromic dye responds to the light and darkens, thereby blocking the passage of the irradiated light employed in polymerization from passing into the interior of the film. Thus, the curing reaction can progress well at the surface where the light that has been irradiated for polymerization enters, producing great hardness, while impeding the curing reaction at the other surface. To achieve the above effect, the concentration of the photochromic dye in the photochromic liquid is desirably 0.01 to 20 mass parts, preferably 0.1 to 10 mass parts, per 100 mass parts of the above-described polymerizable component (radical polymerizable monomer and the like).

(iii) Polymerization Initiator

The polymerization initiator that is added to the photochromic liquid can be suitably selected from among known thermal polymerization initiators and photopolymerization initiators based on the polymerization method.

The photopolymerization initiator is not specifically limited. Examples are benzoin, benzoin methyl ethyl, benzoin butyl ether, benzophenol, acetophenone, 4,4'-dichlorobenzophenone, diethoxyacetophenone, 2-hydroxy-2-methyl-1-phenylpropane-1-one, benzyl methyl ketal, 1-(4-isopropylphenyl)-2-hydroxy-2-methylpropane-1-one, 1-hydroxycyclohexyl phenyl ketone, 2-isopropylthiooxanthone, bis(2,6-dimethoxybenzoyl-2,4,4-trimethyl pentyl phosphine oxide, bis(2,4,6-trimethylbenzoyl)phenyl phosphine oxide, 2,4,6-trimethylbenzoyldiphenyl phosphine oxide, and 2-benzyl-2-dimethylamino-1-(4-morpholinophenyl)butanone-1. Desirable compounds are 1-hydroxycyclohexyl phenyl ketone, 2-isopropylthiooxanthone, bis(2,6-dimethoxybenzoyl-2,4,4-trimethyl pentyl phosphine oxide, bis(2,4,6-trimethylbenzoyl)phenyl phosphine oxide, and 2,4,6-trimethylbenzoyldiphenyl phosphine oxide.

More than one of these photopolymerization initiators may be suitably mixed for use. The blending amount of the photopolymerization initiator to the total quantity of photochromic liquid is normally 0.001 to 5 mass parts, desirably 0.1 to 1 mass part, per 100 mass parts of the polymerizable component (radical polymerizable monomer and the like).

When forming a photochromic film by thermal polymerization, examples of utilizable thermal polymerization initiators are: benzoyl peroxide, p-chlorobenzoyl peroxide, decanoyl peroxide, lauroyl peroxide, acetyl peroxide, and other diacyl peroxides; t-butylperoxy-2-ethylhexanoate, t-butyl peroxydicarbonate, cumyl peroxyneodecanate, t-butyl peroxybenzoate, and other peroxy esters; diisopropyl peroxydicarbonate, di-2-ethylhexyl peroxydicarbonate, di-sec-butyl oxycarbonate, and other percarbonates; 2,2'-azobisisobutyronitrile, 2,2'-azobis(4-dimethylvaleronitrile), 2,2'-azobis(2-methylbutyronitrile), 1,1'-azobis(cyclohexane-1-carbonitrile), and other azo compounds.

The quantity of the thermal polymerization initiator employed varies with the polymerization conditions, type of initiator, and type and composition of polymerizable monomer. Normally, a quantity ranging from 0.01 to 10 mass parts per 100 mass parts of the above-described polymerizable components is suitable. The above thermal polymerization initiators may be employed singly or in combinations of two or more.

(iv) Additives

To enhance the durability of the photochromic dye, increase the darkening speed, increase the fading speed, and enhance moldability, additives such as surfactants, oxidation inhibitors, radical scavengers, UV stabilizers, UV absorbing agents, mold release agents, coloration inhibitors, antistatic agents, fluorescent colorants, colorants, pigments, fragrance materials, and plasticizers can be added to the photochromic liquid. Known compounds can be employed as the additives without specific limitation.

Any from among nonionic, anionic, and cationic surfactants can be employed as the surfactants. However, the use of nonionic surfactants is desirable due to their solubility in polymerizable monomers. Specific examples of suitably employed nonionic surfactants are: sorbitan fatty esters, glycerin fatty esters, decaglycerin fatty esters, propylene glycol/pentaerythritol fatty esters, polyoxyethylene sorbitan fatty esters, polyoxyethylene sorbit fatty esters, polyoxyethylene glycerin fatty esters, polyethylene glycol fatty esters, polyoxyethylene alkyl ethers, polyoxyethylene phytosterol/phytostanols, polyoxyethylene polyoxypropylene alkyl ethers, polyoxyethylene alkyl phenyl ethers, polyoxyethylene castor oil/hardened castor oil, polyoxyethylene lanolin/lanolin alcohol/beeswax derivatives, polyoxyethylene alkyl amines/fatty acid amides, polyoxyethylene alkyl phenyl formaldehyde condensates, and single-chain polyoxyethylene alkyl ethers. In the use of the surfactant, two or more surfactants may be combined for use. The quantity of surfactant added desirably falls within a range of 0.1 to 20 mass percent per 100 mass parts of the above-described polymerizable components.

Oxidation inhibitors, radical scavengers, UV stabilizers, and UV absorbing agents may be suitably employed in the form of hindered amine light stabilizers, hindered phenol oxidation inhibitors, phenol-based radical scavengers, sulfur-based oxidation inhibitors, benzotriazole-based compounds, benzophenone-based compounds, and the like. These oxidation inhibitors, radical scavengers, UV stabilizers, and UV absorbing agents can be employed in combinations of two or more. In the use of these nonpolymerizable compounds, surfactants may be employed in combination with oxidation inhibitors, radical scavengers, UV stabilizers, and UV absorbing agents. The quantity that is added of these oxidation inhibitors, radical scavengers, UV stabilizers, and UV absorbing agents desirably falls within a range of 0.001 to 20 mass parts per 100 mass parts of the above-described polymerizable components.

There is a known problem of polymer materials being degraded by the following mechanism due to oxidation in the presence of oxygen that is occasioned by energy such as ultraviolet radiation and heat. First, when a polymeric compound is exposed to a high level of energy, such as by being irradiated with UV, radicals are produced within the polymer. These then serve as starting points for the generation of new radicals and peroxides. Since peroxides are generally unstable, they are readily decomposed by heat and light, producing more new radicals. Once oxidation has begun in this manner, it begins to occur in chainlike fashion, degrading the polymer material and reducing its function. To prevent oxidation by such a mechanism, the methods of (1) rendering the radicals that have been produced inactive, and (2) breaking down the peroxides that have been generated into harmless substances, so that they stop producing radicals, are conceivable. Accordingly, the use of compounds capable of capturing radicals (radical scavengers) to prevent oxidation by method (1) is conceivable, and the use of compounds having the ability to break down peroxides (peroxide compound degrading agents) to prevent oxidation by the method of (2) is conceivable. In the present invention, the use of both compounds having the ability to scavenge radicals and compounds having the ability to break down peroxides as oxidation inhibitors is possible. The use of compounds having the ability to scavenge radicals is desirable. Photochromic compounds absorb ultraviolet radiation from sunlight, develop color as their molecular structure changes, and return to their original state when they absorb heat and visible light. Energy is transferred to oxygen along this change pathway in the presence of oxygen, producing oxygen radicals of great oxidizing power. Accordingly, compounds having the ability to scavenge radicals can capture these oxygen radicals, thereby effectively preventing oxidation in the photochromic film. Since the progression of radical polymerization can be inhibited by the addition of radical scavengers, the addition of radical scavengers is also effective in forming a flexible photochromic film.

From the above perspectives, hindered amine and hindered phenol compounds are examples of desirable additives. Since these compounds can exhibit the ability to scavenge radicals, they can contribute to the formation of a flexible photochromic film. They can also prevent the oxidation of the photochromic film that is obtained to enhance durability. The addition of the above compounds can also prevent deterioration of the photochromic dye during curing. Known hindered amine and hindered phenol compounds may be employed without specific limitation. Among the hindered amine compounds, when employed in coating, particularly as compounds having the effect of preventing the deterioration of photochromic dyes, examples are bis(1,2,2,6,6-pentamethyl-4-piperidyl) sebacate, and Adecastab LA-52, LA-62, LA-77, and LA-82, made by Asahi Denka Kogyo K. K. A desirable example of a hindered phenol compound is dibutyl hydroxytoluene acid (BHT). The quantity added, by way of example, falls within a range of 0.001 to 20 mass parts, desirably a range of 0.1 to 10 mass parts, and preferably, a range of 1 to 5 mass parts per 100 mass parts of the above-described polymerizable components.

The various additives, such as the above compounds having radical-scavenging ability, can be added to the photochromic liquid, and can also be added following formation of the photochromic film by impregnation treatment or the like. In that case, impregnation is desirably conducted by applying a compound having radical-scavenging ability from the surface on the object side.

It is also desirable to incorporate surfactants, leveling agents, and the like into the photochromic liquid to enhance uniformity during film formation. The addition of silicone-based and fluorine-based leveling agents having leveling capability is particularly desirable. The quantity added is not specifically limited. A quantity of 0.01 to 1.0 mass percent of the total quantity of photochromic liquid is normal, and 0.05 to 0.5 mass percent is desirable.

In the present invention, it is desirable not to add the various components that are normally added (adhesives such as coupling agents, or polymerization catalysts of coupling agents) to enhance adhesion to the photochromic liquid. Thus, when manufacturing a lens by cast polymerization, described further below, the molded product with photochromic film is readily removed from the forming mold. The coating liquid comprising a silane coupling agent and the like reduces the liquid life (pot life) due to self-polymerization during storage of the liquid. Therefore, it is desirable not to comprise such components from the perspective of good operating properties.

In the present invention, the method of preparing the photochromic liquid is not specifically limited. The photochromic liquid can be prepared by weighing out and mixing prescribed quantities of the various components. Nor is the order in which the various components are added specifically limited; all the components can be added simultaneously, or just the monomer components can be mixed in advance, with the photochromic dye and other additives being admixed just before polymerization.

The photochromic liquid desirably has a viscosity at 25° C. of 20 to 500 cp, preferably 50 to 300 cp, and more preferably, 60 to 200 cp. Employing a viscosity within this range can facilitate coating for the photochromic liquid and make it easy to obtain a photochromic film of desired thickness.

(2) Curing Conditions

When manufacturing the photochromic lens of the present invention by the cast polymerization method, first, one surface of the mold for formation of one of surfaces of the lens is coated with a photochromic liquid, and the photochromic liquid that has been coated is subjected to curing treatment to form a photochromic film on the surface of the mold. Subsequently, the mold on the surface of which the photochromic film has been formed is used to conduct a polymerization reaction of a lens substrate. The details of polymerization of the lens substrate and the like are given below.

The photochromic liquid can be coated on the surface of the mold by a known method such as dipping, spin coating, or spraying method. From the perspectives of the viscosity of the coating liquid and surface precision, the use of spin coating method is desirable. The quantity coated can be suitably adjusted based on the desired thickness of the photochromic film. When forming a meniscus lens, a convex mold having a forming surface on a convex side for forming the concave surface of the lens (the eyeball side during use), and a concave mold having a forming surface on a concave side for forming the convex surface of the lens (the object side during use), are employed. In the present invention, the photochromic liquid can be coated on the concave mold to form a photochromic film, yielding a photochromic lens having a photochromic film on the object side thereof. In the method of manufacturing a photochromic lens by coating and curing a photochromic liquid on a lens, the photochromic liquid is coated on the convex surface that is positioned on the object side during use. Therefore, the photochromic liquid that has been coated sometimes runs off the convex surface when the viscosity of the photochromic liquid is low or a large quantity is being coated. In contrast, coating the photochromic liquid to the concave surface as set forth above affords the advantage of stably holding the photochromic liquid on the surface of the mold without it running off.

Once the photochromic liquid has been coated on the mold surface as set forth above, the photochromic liquid can be subjected to curing treatment to form a photochromic film on the mold. By adjusting the curing conditions during this process, it is possible to adjust the curing state of the photochromic film obtained. To control the curing state, the curing treatment is desirably conducted by photopolymerization. In that case, it is possible to adjust the distance between the light source and the mold surface (surface on which the photochromic liquid has been coated), the illuminance, the irradiation energy, and the irradiation period to obtain a photochromic film wherein the vicinity of the surface on the side that is irradiated with polymerizing light is cured, the interior remains in an uncured state, and the other surface is imparted with a suitable degree of flexibility. To increase curing efficiency, the irradiation with light is desirably conducted in an inert atmosphere.

The light that is irradiated can be suitably selected based on the polymerization initiator contained in the photochromic liquid. As set forth above, to control the curing reaction through darkening of the photochromic dye, light having a wavelength to which the photochromic dye responds, such as light having a wavelength of 150 to 380 nm, desirably ultraviolet radiation (a wavelength of 200 to 380 nm), can be employed. A known ultraviolet light source in the form of an ultrahigh-pressure mercury lamp, high-pressure mercury lamp, low-pressure mercury lamp, xenon lamp, carbon arc, sterilizing lamp, electrodeless lamp, or the like can be employed. The distance between the light source and the mold surface, the irradiation energy, and the irradiation period are desirably adjusted taking into account the composition of the photochromic liquid and the quantity coated. Specifically, an irradiation energy of 1 to 100 $J/cm^2$, desirably 1 to 75 $J/cm^2$, can be employed. For example, the distance between the light source and the mold surface can be 100 to 300 mm, the illuminance can be 100 to 250 $mW/cm^2$, and the irradiation period can be 10 to 400 seconds. An irradiation period of 10 to 300 seconds is further preferred.

As set forth above, by irradiating the surface of the mold on which the photochromic liquid has been coated with light, it is possible to form a photochromic film at least the outermost surface of which has been cured and the interior of which contains uncured curable components. By employing a mold comprised of an optical transparent material (such as glass), the irradiation with light can be conducted through the mold, making it possible to adjust the hardness in the vicinity of the surface facing the surface of the mold. This makes it possible to ensure the durability of the photochromic film. However, since the surface facing the surface of the mold is normally positioned on the light entry surface side during use, when conducting irradiation with light through the mold, the light irradiation should be set at a level ensuring the ease of movement of the photochromic dye on the light entry surface side. The light irradiation through the mold is preferably carried out at the irradiance level that is lower than that of the light irradiation onto the surface coated with the photochromic liquid, for example, at an irradiance level of 0.1 to 30 $J/cm^2$. As will be set forth further below, when a hard coating or an antireflective film is provided over the photochromic film, since the photochromic film surface is protected thereby, it is possible to ensure durability without irradiating light through the mold.

The photochromic lens of the present invention can be manufactured by a coating method such as that set forth above. Since the surface on the opposite side from the surface facing the lens substrate is normally placed on the side of the surface through which light enters, it is desirable to impart suitable flexibility to this surface. Thus, when employing a coating method, once the photochromic liquid has been coated to the lens substrate, it is desirable to irradiate the photochromic liquid with light from the lens substrate side. The coating and curing treatment of the photochromic liquid in this method can be conducted based on the above-described method and conditions.

However, when curing the photochromic liquid by UV irradiation by employing this method, it is desirable to employ a lens substrate that does not contain an ultraviolet absorbing agent. When the lens substrate contains an ultraviolet absorbing agent, the greater portion of the UV radiation that is irradiated will end up being absorbed by the lens substrate, making it difficult to achieve curing to a degree ensuring adhesion between the lens substrate and the facing surface of the photochromic film.

In the coating method, it is possible to employ in combination light irradiated from the lens substrate side and light irradiated from the side of the surface coated with the photochromic liquid. However, in the same manner as when irradiating light from the mold side in the coasting polymerization method, the light irradiation should be set at a level adequate to ensure ease of movement of the photochromic dye on the light entry surface side.

(3) Thickness of the Photochromic Film

The curing state of the photochromic film can also be adjusted through the thickness of the photochromic film. When the photochromic film is excessively thin, most of the light that is irradiated passes through the film, promoting polymerization throughout the film and thus making it difficult to impart suitable flexibility to the photochromic film. Further, since there are few portions in which the dye can move about readily in the photochromic film, it is difficult to increase the response speed of the darkening and fading and darkening density. From the above perspectives, the thickness of the photochromic film is desirably equal to or greater than 10 micrometers, preferably 20 to 60 micrometers.

By controlling the curing state in the photochromic film as set forth above, it is possible to obtain a photochromic film that contains both a cured resin, formed by curing curable components, and uncured curable components. Surface B in the photochromic film (the surface in contact with the lens substrate in the lens of the embodiment in FIG. 1) and the vicinity thereof desirably contain cured resin as their main component. By contrast, the content rate of the cured resin in surface A (the surface in contact with the surface of the mold when employing the cast polymerization method) and the vicinity thereof is desirably lower than the content rate of the cured resin in surface B and the vicinity thereof. This makes it possible to obtain a photochromic lens with surface A that is imparted with suitable flexibility. The above "vicinity" means, for example, the region in which the hardness gradually decreases within the outer layer portion running from the surface to the interior of the photochromic layer.

Lens Substrate

Various substrates commonly employed as plastic lenses can be employed as the lens substrate in the photochromic lens of the present invention. Examples of the lens substrates are: copolymers of methyl methacrylate and one or more additional monomer, copolymers of diethylene glycol bisallyl carbonate and one or more additional monomers, polyurethane and polyurea copolymers, polycarbonate, polystyrene, polyvinyl chloride, unsaturated polyester, polyethylene terephthalate, polyurethane, polythiourethane, sulfide resins employed an ene-thiol reaction, and sulfur-containing vinyl polymers. Of these, urethanes are desirable, but this is not a limitation. The lens substrate is desirably a plastic lens substrate, preferably a plastic lens substrate for eyeglasses.

Hard Coating and Antireflective Film

In the photochromic lens of the present invention, a hard coating layer may be present on the photochromic film. Further, an antireflective film may be further present on the hard coating layer.

The material of the hard coating layer is not specifically limited; coating compositions comprised of known organic silicon compounds and metal oxide colloidal particles can be employed.

The organic silicon compound denoted by general formula (III) below, or the hydrolysis product thereof, is examples of the organic silicon compound.

$$(R^{91})_a(R^{93})_b Si(OR^{92})_{4-(a'+b')} \tag{III}$$

(In the formula, $R^{91}$ denotes an organic group comprising a glycidoxy group, epoxy group, vinyl group, methacryloxy group, acryloxy group, mercapto group, amino group, phenyl group and the like, $R^{92}$ denotes an alkyl group having 1 to 4 carbon atoms, acyl group having 1 to 4 carbon atoms, or aryl group having 6 to 10 carbon atoms, $R^{93}$ denotes an alkyl group having 1 to 6 carbon atoms or aryl group having 6 to 10 carbon atoms, and each of a' and b' denotes 0 or 1.)

Examples of the alkyl group having 1 to 4 carbon atoms of $R^{92}$ are linear or branched methyl groups, ethyl groups, propyl groups, and butyl groups.

Examples of the acyl group having 1 to 4 carbon atoms of $R^{92}$ are acetyl groups, propionyl groups, oleyl groups, and benzoyl groups.

Example of the aryl group having 6 to 10 carbon atoms of $R^{92}$ are phenyl groups, xylyl groups, and tolyl groups.

Examples of the alkyl group having 1 to 4 carbon atoms of $R^{93}$ are linear or branched methyl groups, ethyl groups, propyl groups, butyl groups, pentyl groups, and hexyl groups.

Examples of the aryl group having 6 to 10 carbon atoms of $R^{93}$ are phenyl groups, xylyl groups, and tolyl groups.

Specific examples of the compound denoted by general formula (III) are: methyl silicate, ethyl silicate, n-propyl silicate, i-propyl silicate, n-butyl silicate, sec-butyl silicate, t-butyl silicate tetraacetoxysilane, methyl trimethoxysilane, methyl triethoxysilane, methyl tripropoxysilane, methyl triacetoxysilane, methyl tributoxysilane, methyl tripropoxysilane, methyl triamyloxysilane, methyl triphenoxysilane, methyl tribenzyloxysilane, methyl triphenethyloxysilane, glycidoxymethyl trimethoxysilane, glycidoxymethyl triethoxysilane, α-glycidoxyethyl triethoxysilane, β-glycidoxyethyl trimethoxysilane, β-glycidoxyethyl triethoxysilane, α-glycidoxypropyl trimethoxysilane, α-glycidoxypropyl triethoxysilane, β-glycidoxypropyl trimethoxysilane, β-glycidoxypropyl triethoxysilane, γ-glycidoxypropyl trimethoxysilane, γ-glycidoxypropyl triethoxysilane, γ-glycidoxypropyl tripropoxysilane, γ-glycidoxypropyl tributoxysilane, γ-glycidoxypropyl triphenoxysilane, α-glycidoxybutyl trimethoxysilane, α-glycidoxybutyl triethoxysilane, β-glycidoxybutyl trimethoxysilane, β-glycidoxybutyl triethoxysilane, γ-glycidoxybutyl trimethoxysilane, γ-glycidoxybutyl triethoxysilane, δ-glycidoxybutyl trimethoxysilane, δ-glycidoxybutyl triethoxysilane, (3,4-ethoxycyclohexyl)methyl trimethoxysilane, (3,4-epoxycyclohexyl)methyl triethoxysilane, β-(3,4-epoxycyclohexyl)ethyl trimethoxysilane, β-(3,4-epoxycyclohexyl)ethyl triethoxysilane, β-(3,4-epoxycyclohexyl)ethyl tripropoxysilane, β-(3,4-epoxycyclohexyl)ethyl tributoxysilane, β-(3,4-epoxycyclohexyl)ethyl triphenoxysilane, γ-(3,4-epoxycyclohexyl)

propyl trimethoxysilane, γ-(3,4-epoxycyclohexyl)propyl triethoxysilane, δ-(3,4-epoxycyclohexyl)butyl trimethoxysilane, δ-(3,4-epoxycyclohexyl)butyl triethoxysilane, glycidoxymethyl methyldimethoxysilane, glycidoxymethyl methyldiethoxysilane, α-glycidoxyethyl methyldimethoxysilane, α-glycidoxyethyl methyldiethoxysilane, β-glycidoxyethyl methyldimethoxysilane, β-glycidoxyethyl methyldiethoxysilane, α-glycidoxypropyl methyldimethoxysilane, α-glycidoxypropyl methyldiethoxysilane, β-glycidoxypropyl methyldimethoxysilane, β-glycidoxypropyl methyldiethoxysilane, γ-glycidoxypropyl methyldimethoxysilane, γ-glycidoxypropyl methyldiethoxysilane, γ-glycidoxypropyl methyldipropoxysilane, γ-glycidoxypropyl methyldibutoxysilane, γ-glycidoxypropyl methyldiphenoxysilane, γ-glycidoxypropyl ethyldimethoxysilane, γ-glycidoxypropyl ethyldiethoxysilane, γ-glycidoxypropyl vinyldimethoxysilane, γ-glycidoxypropyl vinyldiethoxysilane, γ-glycidoxypropyl phenyldimethoxysilane, γ-glycidoxypropyl phenyldiethoxysilane, ethyl trimethoxysilane, ethyl triethoxysilane, vinyl trimethoxysilane, vinyl triacetoxysilane, vinyl trimethoxyethoxysilane, phenyl trimethoxysilane, phenyl triethoxysilane, phenyl triacetoxysilane, γ-chloropropyl trimethoxysilane, γ-chloropropyl triethoxysilane, γ-chloropropyl triacetoxysilane, 3,3,3-trifluoropropyl trimethoxysilane, γ-methacryloxypropyl trimethoxysilane, γ-mercaptopropyl trimethoxysilane, γ-mercaptopropyl triethoxysilane, β-cyanoethyl triethoxysilane, chloromethyl trimethoxysilane, chloromethyl triethoxysilane, N-(β-aminoethyl)γ-aminopropyl trimethoxysilane, N-(β-aminoethyl)γ-aminopropyl methyldimethoxysilane, γ-aminopropyl methyldimethoxysilane, N-(β-aminoethyl)γ-aminopropyl triethoxysilane, N-(β-aminoethyl)γ-aminopropylmethyl diethoxysilane, dimethyl dimethoxysilane, phenylmethyl dimethoxysilane, dimethyl diethoxysilane, phenylmethyl diethoxysilane, γ-chloropropyl methyldimethoxysilane, γ-chloropropyl methyldiethoxysilane, dimethyl diacetoxysilane, γ-methacryloxypropyl methyldimethoxysilane, γ-methacryloxypropyl methyldiethoxysilane, γ-mercaptopropyl methyldimethoxysilane, γ-mercaptopropyl methyldiethoxysilane, methylvinyl dimethoxysilane, and methylvinyl diethoxysilane.

Examples of the metal oxide colloidal particles are tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), and antimony oxide ($Sb_2O_5$). These may be employed singly or in combinations of two or more.

Neither the material nor the method of forming the above antireflective film is specifically limited. A single layer or a multilayered film of a known inorganic oxide may be employed.

Examples of the inorganic oxide are: silicon dioxide ($SiO_2$), zirconium oxide ($ZrO_2$), aluminum oxide ($Al_2O_3$), niobium oxide ($Nb_2O_5$), and yttrium oxide ($Y_2O_3$).

In the photochromic lens of the present invention, neither the thickness of the lens substrate nor those of the hard coating and antireflective film, provided as needed, are specifically limited. By way of example, the thickness of the lens substrate is 1 to 30 mm, that of the hard coating is 0.5 to 10 micrometers, and that of the antireflective film is 0.1 to 5 micrometers. The thickness of the photochromic film is as set forth above.

Suitable methods of manufacturing the photochromic lens of the present invention will be described next.

The photochromic lens of the present invention can be manufactured by the cast polymerization and coating methods set forth above. The method comprising the first step to the fourth step below is an example of a desirable embodiment of cast polymerization. However, the photochromic lens of the present invention is not limited to those obtained by the following method.

(First Step) A photochromic liquid comprising a photochromic dye and a curable component is coated on one surface of a first mold for formation of one of the surfaces of a lens.

(Second Step) The photochromic liquid is subjected to curing treatment to form a photochromic film wherein at least the outermost surface is cured and an uncured curable component is contained in the interior.

(Third Step) The first mold and a second mold for formation of the other surface of the lens are placed so that the outermost surface of the photochromic film faces a surface of the second mold, and a ring-shaped gasket is placed around the two molds to form a cavity with the two molds and the gasket, with the photochromic film being placed within the cavity.

(Fourth Step) A lens starting material liquid comprising a polymerizable component is introduced into the cavity and the polymerizable component is subjected to polymerization reaction within the cavity.

The above first step and second step are as set forth above.

The above third step and fourth step will be described below.

(Third Step)

In the third step, the first mold, on the surface of which a photochromic film has been formed in the second step, is placed facing the other surface of the lens, and a ring-shaped gasket is placed around the two molds to form a cavity with the two molds and the gasket. Here, the first mold is placed with the outermost surface of the photochromic film facing the surface of the second mold. Thus, the photochromic film is positioned within the cavity.

As the mold and the gasket, those commonly employed in cast polymerization can be employed as they are. Chemically strengthened glass molds are desirably employed, since they tend not to be damaged or develop scratches.

FIG. 3 is a schematic of a lens casting mold configured with the first mold, second mold, and gasket arranged as set forth above. The third step will be described based on FIG. 3. However, the present invention is not limited to the embodiment shown in FIG. 3.

In FIG. 3, cavity 13 is formed within lens casting mold 1 with first mold 10, which is a concave mold having a forming surface on a concave surface for forming the front (convex) surface of the lens; second mold 11, which has a forming surface on the convex side for forming the rear (concave) surface of the lens; and gasket 12. Gasket 12 functions as the outer perimeter holder of the gasket, and plays the role of determining the thickness of the lens.

The first and second molds have nontransferring surfaces (nonworking surfaces 101 and 111) that can be handled by a manufacturing jig, as well as transfer surfaces for transferring the optical surfaces of the lens (working surfaces 102, 112). Working surfaces 102 and 112 are surfaces that transfer the optical surface shape and surface state of the lens. The photochromic film is formed on working surface 102 in the second step.

When the photochromic film contains an oxidation inhibitor, the first mold on which the photochromic film has been formed is desirably annealed prior to forming the cavity. Thus, the oxidation inhibitor contained in the photochromic film can be prevented from leaching out into the lens starting material liquid within the cavity. The annealing conditions can be suitably set.

In the present invention, it is desirable to subject the outermost surface of the photochromic film formed on the surface of the first mold to dry etching treatment such as UV ozone or plasma treatment before forming the cavity described above. Conducting such treatment can increase adhesion of the lens substrate and photochromic film without the use of an adhesive. The effect that is obtained without incorporating an adhesive into the photochromic film is as described above.

By conducting the above UV ozone treatment, bonds are severed at the molecular level on the photochromic film surface, highly hydrophilic functional groups (such as —OH, —CHO, —COOH) are produced, and substances contained in the lens substrate bond to the components of the photochromic film, which is thought to enhance adhesion between the lens substrate and the photochromic film. Since the UV ozone treatment cleans away impurities contained in the photochromic film, the impurities do not hinder adhesion to the lens substrate, which is thought to enhance adhesion.

FIG. 4 shows an example of UV ozone treatment. The UV ozone treatment, as shown in FIG. 4, can be conducted with a mold on which has been formed a photochromic film disposed beneath a UV lamp so that the photochromic film is positioned on the surface. Here, the distance between the UV lamp and the surface of the photochromic film is desirably 10 to 20 cm when the irradiation energy is about 1 to 10 mW/cm$^2$. The processing period can be, for example, 5 to 600 seconds.

When conducting the plasma treatment, the processing conditions are desirably an output of 100 to 300 W and a processing period of 10 to 300 seconds. The gas that is introduced is not specifically limited. Air, oxygen, nitrogen, and the like can be employed.

(Fourth Step)

The fourth step is the step in which the lens starting material liquid is introduced into the cavity formed in the third step, the lens substrate is polymerized, and a photochromic film is formed on the lens substrate.

The lens starting material that is introduced into the cavity can contain the various above-described starting material monomers, oligomers, and/or prepolymers for the polymer constituting the lens substrate. A mixture of two or more monomers can be contained for forming a copolymer. When necessary, a catalyst selected based on the type of monomer can be added to the lens starting material liquid. The various additives set forth above can also be contained in the lens starting material liquid.

In the conventional method of coating a coating liquid containing a photochromic dye on a plastic lens and curing the coating liquid to obtain a lens with a photochromic film, when the photochromic film is formed by irradiation with UV radiation and an ultraviolet absorbing agent is contained in the lens substrate, most of the UV radiation that is irradiated ends up being absorbed by the lens substrate, even when the UV irradiation is conducted from the lens substrate side. Accordingly, in this case, the UV irradiation is conducted from the photochromic film side. However, in this method, it is difficult to increase the hardness of the surface of the photochromic film facing the lens substrate to a higher level than the other surface. By contrast, since it is possible to cure the photochromic film to a desired hardness in advance by the method of manufacturing a photochromic lens of the present invention, a photochromic film can be formed to desired hardness on the substrate even when an ultraviolet absorbing agent is contained in the lens substrate. Thus, the cast polymerization method is particularly suitable as a method of obtaining a photochromic lens with a lens substrate that contains an ultraviolet absorbing agent.

The introduction of the lens starting material liquid into the cavity and its subsequent polymerization reaction can be conducted in the same manner as in ordinary cast polymerization. In the present invention, as set forth above, the photochromic film is desirably cured by photopolymerization. Additionally, curing of the lens substrate is desirably conducted by thermal polymerization. When curing the photochromic film and the lens substrate by the same type of polymerization reaction, one of the polymerization reactions ends up being affected by the other. With the cast polymerization method, it is particularly difficult to separately control the state of polymerization of the photochromic film and that of the lens substrate. By contrast, when forming a photochromic film that is cured by photopolymerization on the lens substrate within the cavity, it is possible to form on the lens substrate a photochromic film in which a desired state of curing is maintained if the lens substrate is cured by heating, since the heating does not promote polymerization of the photochromic film.

The heating conditions for curing the lens substrate can be suitably adjusted based on the type and composition (when a mixture) of the polymerizable components in the lens starting material liquid and on the type of catalyst. The formed product in the shape of a lens on which a photochromic film has been coated is removed from the casting mold once polymerization has been completed.

A photochromic lens can be obtained by the above steps. Various coatings such as a hard coating and antireflective film can be formed by known methods on the photochromic lens that has been obtained.

[Method of Manufacturing a Photochromic-Lens]

The method of manufacturing a photochromic lens of the present invention is that in which a photochromic lens comprising a photochromic film on a lens substrate is obtained by conducting the following steps.

(First Step) A photochromic liquid comprising a photochromic dye and a curable component is coated on one surface of a first mold for formation of one of surfaces of a lens.

(Second Step) The photochromic liquid is subjected to curing treatment to form a photochromic film having a nanoindentation hardness ranging from 500 to 5000 nm on an outermost surface thereof as well as having a smaller nanoindentation hardness on a surface facing the first mold than that on the outermost surface.

(Third Step) The first mold and a second mold for formation of the other surface of the lens are placed so that the outermost surface of the photochromic film faces a surface of the second mold, and a ring-shaped gasket is placed around the two molds to form a cavity with the two molds and the gasket, with the photochromic film being placed within the cavity.

(Fourth Step) A lens starting material liquid comprising a curable component is introduced into the cavity and the curable component is subjected to curing reaction within the cavity.

In the method of manufacturing a photochromic lens of the present invention, the outermost surface of the photochromic film in contact with the lens starting material liquid is cured to impart a prescribed hardness prior to cast polymerization. Thus, mixing of the lens starting material liquid and the uncured portion of the photochromic film is prevented in the vicinity of the outermost surface of the photochromic film during cast polymerization. Since mixing at the interface causes clouding and striae, preventing mixing at the interface in the above fashion can yield a photochromic lens affording excellent optical characteristics.

In the method of manufacturing a photochromic lens of the present invention, the hardness of the surface of the photochromic film facing the first mold is made lower than the hardness of the other surface, imparting suitable flexibility (fluidity) to the vicinity of the surface on the surface side through which light enters during use. This can achieve a marked increase in the light responsiveness of the outer layer portion of the photochromic film on the object side. This point is as set forth above.

Thus, the present invention can yield a photochromic lens having both excellent light responsiveness and excellent optical characteristics.

The details of the first step to the fourth step are described below.

(First Step)

In this step, a photochromic liquid is coated to one surface of a mold (the first mold) for forming one of the surfaces of a lens.

The photochromic liquid comprises at least a photochromic dye and a curable component, and optionally comprises a polymerization initiator and various additives. The details of the various components and coating method are as set forth above.

(Second Step)

In this step, the photochromic liquid coated on the first mold is subjected to curing treatment to form a photochromic film on the first mold. By adjusting the curing state in this process, the cured state of the photochromic film obtained can be adjusted and desired hardness (nanoindentation hardness) can be imparted to each surface.

The curing state of the photochromic film can be controlled by (1) the composition of the photochromic liquid, (2) the curing conditions, and (3) the thickness of the photochromic film. The details of (1) to (3) are as set forth above. The photochromic film can be cured in this step by either photopolymerization or thermal polymerization. To obtain a photochromic film having two surfaces of differing hardness, it is desirable to employ photopolymerization, which facilitates partial control of the curing state. When employing photopolymerization, light can be irradiated onto the photochromic liquid-coated surface of the first mold to yield a photochromic film in which the vicinity of the surface (outermost surface of the photochromic film) on the side from which the light is irradiated is cured, the interior remains in an uncured state, and one surface is imparted with suitable flexibility.

In the method of manufacturing a photochromic lens of the present invention, the nanoindentation hardness of the outermost surface of the photochromic film is kept to 500 to 5,000 nm by controlling the cured state of the photochromic film in the above-described manner. When the nanoindentation hardness of the outermost surface (the surface in contact with the photochromic liquid during cast polymerization) is less than 500 nm, there are problems in the form of weak adhesion between the lens substrate and the photochromic film and decreased durability of the photochromic lens. Conversely, when the nanoindentation hardness of the outermost surface exceeds 5,000 nm, the uncured portion of the photochromic film mixes with the lens starting material liquid during cast polymerization, creating problems by producing cloudiness and striae in the lens that compromise optical characteristics. The lower limit of the nanoindentation hardness of the outermost surface of the photochromic film is desirably 600 nm, preferably 1,000 nm, more preferably 2,500 nm, and the upper limit thereof is preferably, 3,500 nm.

In the method of manufacturing a photochromic lens of the present invention, in addition to keeping the nanoindentation hardness of the outermost surface of the photochromic film within the above-stated range, the nanoindentation hardness of the opposite surface (the surface facing the surface of the first mold) is kept lower than that of the outermost surface. By rendering the surface that is positioned on the object side (the side of the surface through which light enters) during use flexible in this manner, the photochromic dye readily moves in the vicinity of the above surface. Thus, a photochromic film can be obtained that responds rapidly when light of prescribed wavelength enters, darkening at high density, and fades rapidly when placed in an environment lacking light of the prescribed wavelength.

The nanoindentation hardness of the surface of the photochromic film facing the first mold desirably falls within a range of 800 to 5,000 nm. Since this surface is normally disposed on the object side during use, attaining a nanoindentation hardness of this surface of equal to or greater than 800 nm can produce a state facilitating movement of the photochromic dye in the vicinity of the surface on the object side. Thus, it is possible to obtain a photochromic lens that responds rapidly when light of prescribed wavelength enters, darkening at high density, and fades rapidly when placed in an environment lacking light of the prescribed wavelength. The nanoindentation hardness of the surface of the photochromic film facing the first mold is preferably equal to or lower than 4,000 nm, more preferably equal to or lower than 3,500 nm. The nanoindentation hardness of the surface of the photochromic film facing the first mold is preferably equal to or greater than 900 nm, more preferably equal to or greater than 1,200 nm, and still more preferably, equal to or greater than 2,000 nm.

To achieve the above effects in substantial fashion, curing of the photochromic film and curing of the lens substrate should be conducted by different polymerization reactions. When the photochromic film and the lens substrate are cured by the same type of polymerization reaction, polymerization of the photochromic film ends up progressing during polymerization of the lens substrate, the surface (the surface facing the first mold) that has been imparted with suitable flexibility in the second step ends up being cured, and there may be a risk that ease of movement of the photochromic dye will be lost. Specifically, in the present invention, curing of the photochromic film is desirably conducted by irradiation with light, and curing of the lens substrate is desirably conducted by thermal polymerization.

(Third Step and Fourth Step)

In the third step, the first mold, on the surface of which a photochromic film has been formed in the second step, is placed facing the second mold for formation of the other surface of the lens, and a ring-shaped gasket is placed around the two molds to form a cavity with the two molds and the gasket.

Next, in the fourth step, a lens starting material liquid is introduced into the cavity formed in the third step, the lens substrate is polymerized, and a photochromic film is formed on the lens substrate. The details of the third step and the fourth step are as set forth above.

The method of manufacturing a photochromic lens of the present invention set forth above is suitable as a method of manufacturing the photochromic lens of the present invention.

EXAMPLES

The present invention is further described below through Examples. However, the present invention is not limited to the embodiments shown in the Examples.

Example 1

1. Preparation of Photochromic Liquid

In a plastic container, to 100 weight parts of radical polymerizable monomer comprised of 20 weight parts of trimethylolpropane trimethacrylate, 35 weight parts of BPE oligomer (2,2-bis(4-methacryloyloxypolyethoxyphenyl) propane), 10 weight parts of EB6A (polyester oligomer hexaacrylate), 10 weight parts of polyethylene glycol diacrylate having an average molecular weight of 532, and 10 weight parts of glycidyl methacrylate were added 3 weight parts of photochromic dye in the form of the chromene 1 denoted below, 5 weight parts of a hindered amine compound (oxidation inhibitor) in the form of LS765 (bis(1,2,2,6,6-pentamethyl-4-piperidyl)sebacate and methyl(1,2,2,6,6-pentamethyl-4-piperidyl)sebacate), 0.4 weight part of a UV polymerization initiator in the form of CGI-184 (1-hydroxycyclohexyl phenyl ketone), and 0.1 weight part of CGI403 (bis(2,6-dimethoxybenzoyl-2,4,4-trimethylpentylphosphineoxide). The liquid was degassed for 2 minutes in a rotating and revolving-type stirring and degassing device (AR-250 made by Thinky Corporation) to obtain a photochromic liquid. The viscosity of the liquid obtained was 200 mPa/s.

[Chem. 26]

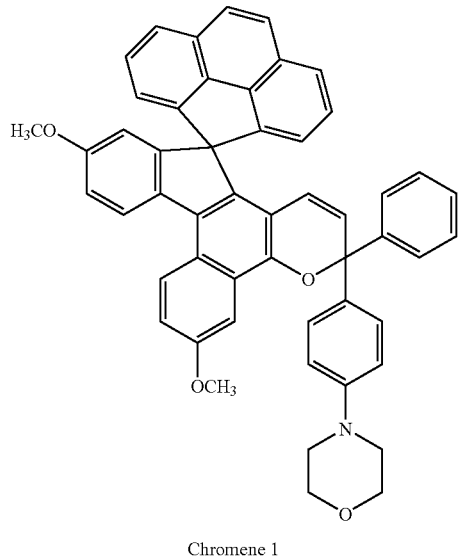

Chromene 1

2. Formation of Photochromic Film

A photochromic film was formed on a mold by the following steps using the photochromic liquid obtained in 1. above.
(1) About 2 g of photochromic liquid was put in drops onto the concave side of a glass mold that had been washed clean and a coating was conducted at 600 spins for 20 seconds by spin coating.
(2) Subsequently, ultraviolet radiation was irradiated from the concave side of the mold with a UV lamp made by Toshiba Lighting & Technology Corporation in a nitrogen atmosphere to cure the photochromic liquid. The UV irradiation was conducted for the irradiation period of 165 seconds at the irradiation distance of 330 mm.
(3) The thickness of the cured film formed on the mold was measured at 30 micrometers.
(4) The glass mold on which the cured film had been provided was heat treated (annealed) for 100 minutes at 110° C., followed by UV ozone treatment (manufactured by Eye Graphics Co., Ltd.) for 180 seconds.

3. Cast Polymerization

A photochromic lens was molded by the following steps using a mold on which a photochromic film had been formed.
(1) A mold on which a photochromic film had been formed was pressed into a cylindrical gasket so as to serve in forming the convex surface of a lens. A mold on which no photochromic film had been formed on the surface serving in forming the concave surface of the lens was pressed into a prescribed position and secured, thereby forming a cavity.
(2) A lens starting material containing a thermosetting urethane monomer was introduced into the cavity formed in (1) and thermally polymerized by a prescribed polymerization program to cure the monomer.
(3) The molds were removed from the lens that had been polymerized and cured. The photochromic film that had been formed on the mold had been transferred to the lens.
(4) The perimeter portion of the lens to which the photochromic film had been transferred was machined and then cleaned, and annealed by a prescribed program.

A meniscus photochromic lens having a photochromic film on the convex surface thereof was obtained by the above steps.

Example 2

Formation of a Photochromic Film 60 Micrometers in Thickness

The spin coating method of 2.(1) in Example 1 was conducted at the spin number of 300 spins for the period of 10 seconds. The remaining processing was identical to that in Example 1. This yielded a photochromic film 60 micrometers in thickness.

Example 3

UV Irradiation Through Both Surfaces of the Mold

UV radiation was irradiated through both the concave and convex surfaces of the molds using a UV lamp made by Toshiba Lighting & Technology Corporation in a nitrogen atmosphere in 2.(2) in Example 1, and the photochromic liquid was cured. The UV irradiation was conducted for 165 seconds through the concave side and for 90 seconds through the convex side at an irradiation distance of 330 mm. The remaining processing was conducted by the same method as in Example 1, yielding a photochromic film 30 micrometers in thickness.

Comparative Example

Coating of Photochromic Liquid on Convex Surface of Lens Substrate and UV Irradiation from Convex Surface Side

1. Preparation of Photochromic Liquid

In addition to the components of Example 1, 4.8 mass parts of an adhesive in the form of an organic silicon compound having an epoxy group (γ-glycidoxypropyl trimethoxysilane)

and 1.6 mass parts of an organic silicon compound having a radical polymerizable functional group in the from of γ-methacryloyloxypropyl trimethoxysilane were put in drops while stirring. Following thorough stirring, 1.4 mass parts of N-methyldiethanolamine were weighed out and put in drops and the mixture was again thoroughly stirred and mixed. Subsequently, 0.1 weight part of a silicone leveling agent in the form of Y-7006 (polyoxyalkylene dimethylpolysiloxane copolymer, made by Nippon Unicar Company Limited.) was added and mixed. The mixture was then degassed for 2 minutes in a rotating and revolving-type stirring and degassing device (AR-250 made by Thinky Corporation) to obtain a photochromic liquid.

2. Forming a Photochromic Lens

A plastic lens substrate in the form of polythiourethane (product name: EYAS (containing an ultraviolet absorbing agent), made by HOYA (Ltd.), having a center thickness of 2.0 mm) was immersed for 5 minutes in a 10 mass percent sodium hydroxide aqueous solution at 60° C., thoroughly rinsed with pure water, and dried. The photochromic liquid prepared in 1. above was then coated on the convex side of the substrate by spin coating.

Subsequently, light irradiation was conducted from the convex side (side of the surface on which the photochromic liquid had been coated) of the lens with a UV lamp made by Toshiba Lighting & Technology Corporation in a nitrogen atmosphere to cure the photochromic film. It was conducted for the irradiation period of 165 seconds at the irradiation distance of 330 mm. The thickness of the cured film was measured at 30 micrometers.

Curing was then conducted for 100 minutes at 110° C., yielding a plastic lens comprising a photochromic film.

Evaluation of the Photochromic Lens (1) Evaluation of Adhesion

The photochromic lenses obtained in Examples 1, 2, and 3 were crosscut to form 100 square grids with a spacing of 1 mm. Adhesive tape (product name: Cellotape, Nichiban (Ltd.)) was firmly applied, rapidly peeled off, and examined to see if the photochromic film had separated. In Table 2, no separation is recorded as 100/100, and separation of all of the square grids as 0/100.

(2) External Appearance

The photochromic lenses obtained in Examples 1, 2, and 3 were visually evaluated under fluorescent light in a darkroom. Those that presented no distortion on the coating film surface and that were evenly coated were evaluated as "good". The results are given in Table 2.

(3) Photochromic Properties (i) Change in Transmittance

The photochromic properties were evaluated by the method described below in accordance with JIS T7333. The surface (the opposite surface from the surface facing the lens substrate) of each of the photochromic films on the photochromic lenses obtained in Examples 1 and 2, and the Comparative Example was light-irradiated with a xenon lamp through an aeromass filter for 15 minutes (900 seconds) to cause the photochromic film to darken. The transmittance at 550 nm was measured with a spectrophotometer made by Otsuka Denshi Kogyo Co., Ltd. to determine the darkening density. The above light irradiation was conducted by setting the irradiation illuminance and the tolerance of the irradiation illuminance as the values indicated in Table 1 below, as specified by JIS T7333. The smaller the numerical value, the better the photochromic property that is indicated. Similarly, light irradiation was conducted for 15 minutes (900 seconds) and the transmittance (550 nm) from when the irradiation was halted was measured to evaluate the fading speed. The faster the transmittance returned to the original level over time, the better the photochromic property. The results are given in FIG. 5. The upper graph in FIG. 5 shows the light transmittance (550 nm) of the photochromic lenses during irradiation (0 to 15 minutes), at the conclusion of irradiation (15 minutes), and following the conclusion of irradiation (from 15 minutes). The lower graph in FIG. 5 shows the light transmittance of the photographic lenses at various different wavelengths when light irradiation by the above method had been conducted for 930 seconds for the photochromic films on the photochromic lenses obtained in Examples 1 and 2 and the Comparative Example.

TABLE 1

| Wavelength range (nm) | Irradiation illuminance (W/m$^2$) | tolerance of the irradiation illuminance (W/m$^2$) |
| --- | --- | --- |
| 300-340 | <2.5 | — |
| 340-380 | 5.6 | ±1.5 |
| 380-420 | 12 | ±3.0 |
| 420-460 | 12 | ±3.0 |
| 460-500 | 26 | ±2.6 |

(ii) Measurement of Relaxation Time

The photochromic lenses obtained in Examples 1 and 2 and the Comparative Example were light-irradiated in the same manner as in (i) above, and the relaxation times during darkening and fading were determined on the photochromic characteristic curve shown in the upper graph of FIG. 5 as the time required to reach a certain state of equilibrium as the photochromic dye was darkening or fading. In this context, the phrase "a certain state of equilibrium" means the change in the state of the dye over a measurement period of 90 seconds during darkening and 360 seconds during fading. The relaxation time (the time required to reach a certain state of equilibrium) was calculated by the following method.

The initial value, saturation value of the change in color, and change amount (initial value−saturation value of the change in color) were first obtained. Next, the numerical value after the elapse of each period=1n((transmittance after the elapse of each period−saturation value of the change in color)/change amount) was plotted for each period elapsed (for example, 30 seconds), and a linear approximation curve was prepared. After calculating the slope (1/τ) of the linear approximation curve that was prepared, the inverse thereof, τ(sec), was obtained and adopted as the relaxation time.

The results are given in Table 3. The relaxation time is an index indicating the photochromic characteristic. The smaller the numerical value, the shorter the time that was required for change, that is, the greater the darkening speed and fading speed. During darkening, when a difference in the relaxation time is about 3 seconds, the difference in darkening speed normally can be confirmed visually. During fading, when a difference in the relaxation time is about 20 seconds, the difference in fading speed normally can be confirmed visually.

(4) Measurement of the Hardness of the Photochromic Film (i) Nanoindentation Hardness The photochromic films were peeled off the photochromic lenses obtained in Examples 1, 2, and 3 and in the Comparative Example. The nanoindentation hardness of each of the two surfaces of each of the photochromic films of Examples 1, 2, and 3 was measured by the above-described method. The nanoindentation hardness of the surface on the object side of the photochromic film of the Comparative Example was measured by the same method. The results are given in Table 2.

(ii) Indentation hardness

Employing an ENT-2100 nanoindentation hardness tester made by Elionix Co., Ltd., a load of 100 mgf was applied, the indentation depth h (nm) corresponding to the indentation load P (mgf) was continuously measured over the entire process from the start of loading to unloading, and a P-h curve was prepared. The indentation hardness H from the P-h curve prepared was obtained from equation (1) above.

(iii) Compound Young's modulus

The compound Young's modulus was obtained from equation (2) above based on the P-h curve prepared in (ii) above.

(iv) Martens hardness

Employing an ENT-2100 nanoindentation hardness tester made by Elionix Co., Ltd., a load of 100 mgf was applied to press the indenter. The surface area of the indenter penetrating beyond the original surface at that time was measured from the indentation depth, and the Martens hardness was obtained as "load/surface area of the indenter penetrating beyond the original surface."

TABLE 2

|  |  | Ex. 1 | Ex. 2 | Ex. 3 | Comp. Ex. |
|---|---|---|---|---|---|
| Evaluation of adhesion |  | 100/100 | 100/100 | 100/100 | — |
| External appearance |  | Good | Good | Good | — |
| Nanoindentation hardness (nm) | Object side | 1011 | 3692 | 1020 | 721 |
|  | Eyeball side | 712 | 1622 | 700 | — |
| Indentation hardness (mgf/μm$^2$) | Object side | 5.4 | 1.3 | 5.3 | 10.4 |
|  | Eyeball side | 10.7 | 3.8 | 11 | — |
| Martens hardness (mgf/μm$^2$) | Object side | 3.6 | 0.3 | 3.6 | 7.1 |
|  | Eyeball side | 210 | 23 | 219 | — |
| Compound Young's modulus (mgf/μm$^2$) | Object side | 101 | 4 | 102 | 204 |
|  | Eyeball side | 210 | 23 | 219 | — |

TABLE 3

|  |  | Ex. 1 | Ex. 2 | Comp. Ex. |
|---|---|---|---|---|
| Photochromic film thickness (μm) |  | 30 | 60 | 30 |
| Relaxation time (s) | During darkening | 25 | 21 | 32 |
|  | During fading | 141 | 116 | 196 |

As shown in the upper graph of FIG. 5, the transmittance changed greatly after the start of irradiation and once irradiation had stopped in the lenses of Examples 1 and 2. This indicated that the response speeds of darkening and fading were rapid. As indicated in the upper and lower graphs of FIG. 5, the light transmittance during irradiation of the lenses of Examples 1 and 2 was lower than that of the lens of the Comparative Example. This indicated that the darkening density during light irradiation was high.

Further, following the end of irradiation, the transmittance of the lenses of Examples 1 and 2 returned to its original level more quickly than that of the Comparative Example, indicating excellent photochromic properties.

When the darkening and fading speeds of the photochromic films on the lenses of Examples 1 and 2 and the Comparative Example were digitized based on the relaxation time, as shown in Table 3, the darkening and fading speeds of the lenses of Examples 1 and 2 were confirmed as being more rapid than those of the lens of the Comparative Example.

The same measurements as described above were conducted for the lens of Example 3, revealed photochromic properties as excellent as those of the lenses of Examples 1 and 2.

As will be understood from the above results, the photochromic lenses of Examples 1 to 3, which had surfaces on the object side that were softer than that of the lens of the Comparative Example and softer than the surfaces on the eyeball side, exhibited excellent photochromic characteristics.

Example 4

Forming the Hard Coating Layer and Antireflective Layer

The processing of 4.5 below was conducted on the meniscus photochromic lens having a photochromic film on a convex surface formed in Example 1 to form a hard coating layer and an antireflective layer.

4. Adjusting the Hard Coating Liquid

Forty-five mass parts of a modified stannic oxide-zirconium oxide-tungsten oxide-silicon oxide composite methanol sol, 15 mass parts of γ-glycidoxypropyl trimethoxysilane, and 3 mass parts of tetraethoxysilane were mixed in a 5° C. atmosphere and the mixture was stirred for one hour. Subsequently, 4.5 mass parts of a 0.001 mole/L concentration of hydrochloric acid were added and the mixture was stirred for 50 hours. Subsequently, solvents in the form of 25 mass parts of propylene glycol monomethyl ether (PGM), 9 mass parts of diacetone alcohol (DAA), 1.8 mass parts of a component (C) in the form of aluminum trisacetyl acetate (AL-AA), and 0.05 mass part of aluminum perchlorate were sequentially added and the mixture was stirred for 150 hours. The solution obtained was passed through a 0.5 micrometer filter and the filtrate was employed as a coating composition.

5. Forming a Hard Coating Layer

The surface of the photochromic film of the photochromic lens formed in Example 1 was subjected to UV ozone treatment for 30 seconds. It was then immersed for 5 minutes in a 10 mass percent sodium hydroxide aqueous solution, thoroughly washed with pure water, and dried. Coating was conducted by dipping (with a drawing rate of 20 cm/minute) with the hard coating composition prepared in 4. above and the hard coating composition was cured by heating for 60 minutes at 110° C. to form a hard coating layer.

6. Forming an Antireflective Film

A plastic lens on which a hard coating layer had been formed in 5. above was placed in a vapor deposition device and heated to 85° C. while the air was evacuated. Evacuation was continued to 2.7 mPa ($2 \times 10^{-5}$ torr). Vapor deposition starting materials were then deposited by electron beam heating, forming an underlayer coating made of $SiO_2$ to a film thickness of 0.6λ; a first refractive layer comprised of a mixed layer made of $Ta_2O_5$, $ZrO_2$, and $Y_2O_3$ (nd=2.05 nλ=0.075λ) and a $SiO_2$ layer (nd=1.46, nλ=0.056λ) over the underlayer; and a second low refractive index layer (nd=1.46, nλ=0.25λ) comprised of a mixed layer made of $Ta_2O_5$, $ZrO_2$, and $Y_2O_3$ (nd=2.05, nλ=0.075λ) and an $SiO_2$ layer to form an antireflective film.

Through the above steps, a photochromic lens was obtained that sequentially comprised a photochromic film, a hard coating layer, and an antireflective layer on the convex surface of a lens substrate. The photochromic lens obtained was evaluated. The fact that a lens presenting no problems in terms of adhesion and external appearance had been obtained was confirmed. The photochromic properties of the lens was evaluated by the same method as that set forth above. The results are given in FIG. 6.

FIG. 6 shows the light transmittance (550 nm) of the photochromic lens during irradiation (0 to 900 seconds), at the end of irradiation (900 seconds), and after the conclusion (900 seconds) of irradiation. As will be understood from FIG. 6, the lens of Example 4 exhibited excellent light responsiveness in the form of high darkening and fading response speeds and a high darkening density.

Example 5

Manufacturing by the Coating Method

The method of UV irradiation in 2. of the Comparative Example was conducted from the concave side of the lens instead of from the convex side of the lens and the lens substrate employed in the Comparative Example was replaced with a lens substrate from which only the ultraviolet absorbing agent had been removed and which passed ultraviolet radiation. With the exception of the above, a photochromic lens having a photochromic film 30 micrometers in thickness was obtained by the same method as in the Comparative Example. Evaluation of the photochromic lens obtained was conducted, revealing a lens presenting no problems in terms of adhesion and external appearance.

The nanoindentation hardness of the two surfaces of the photochromic film obtained were measured by the above-described method, revealing a value of 2,930 nm on the object side and 2,010 nm on the eyeball side. Further, a hard coating layer and an antireflective layer were formed by the same method as in Example 4 on the photochromic lens, yielding a lens presenting no problems with respect to adhesion and external appearance. Additionally, the photochromic properties of the lens were equivalent to that of Example 4.

Example 6

Employing a Hindered Phenol Compound

With the exception that the hindered amine compound was replaced with the quantity of hindered phenol compound (dibutyl hydroxytoluene acid (BHT)) indicated in Table 4 during the preparation of a photochromic liquid, a photochromic lens was prepared by the same method as in Example 1. The nanoindentation hardness of the surface of the lens on the surface side through which light entered during light irradiation was measured by the above-described method. The results are shown in Table 4. The addition quantities that are indicated below are mass parts per 100 g of radical polymerizable monomer.

TABLE 4

Relation between addition quantity (phm) and nanoindentation hardness [nm]

| Addition quantity [phm] | Nanoindentation hardness [nm] | | |
|---|---|---|---|
| | 100 | 1000 | 5000 |
| 0 | 848.4 | 2813.2 | 5923.4 |
| 1 | 881.5 | 2918.2. | 6100.4 |
| 3 | 925.8 | 3094.6 | 6393.4 |
| 5 | 963.4 | 3208.5 | 6637.2 |

The photochromic property (fading property) of the photochromic lens obtained was evaluated by the following method. The results are given in Table 5.

(Measurement of the Fading Half-Value Period)

The surface (opposite surface from the surface facing the lens substrate) of each of the photochromic films on the various photochromic lenses was light-irradiated for 15 minutes (900 seconds) through an aeromass filter with a xenon lamp. Once the photochromic film had darkened, the light irradiation was stopped to cause the photochromic film to fade. The transmittance at a wavelength of 550 nm was measured with a spectrophotometer made by Otsuka Denshi Kogyo Co., Ltd. The transmittance at maximum darkening and fading was determined from the spectrophotometric spectra obtained, and the transmittances were obtained at the first to third half-value periods calculated by the methods indicated below.

First half-value period=the time required for the transmittance at maximum darkening to become the value: [(transmittance at fading)−(transmittance at maximum darkening)]/2;

Second half-value period=the time required for the transmittance at maximum darkening to become the value: [(transmittance at fading)−(transmittance at first half-value period)]/2;

Third half-value period=the time required for the transmittance at maximum darkening to become the value: [(transmittance at fading)−(transmittance at second half-value period)]/2.

TABLE 5

Relation between addition quantity (phm) and photochromic property (fading half-value period)

| Addition quantity [phm] | (1). Transmittance at fading % | (2). Transmittance at maximum darkening % | First half-value period | | Second half-value period | | Third half-value period | |
|---|---|---|---|---|---|---|---|---|
| | | | sec. | (3). Transmittance % | sec. | (4). Transmittance % | sec. | (5). Transmittance % |
| 0 | 90.7 | 18.8 | 91.5 | 54.7 | 219.9 | 72.7 | 476.0 | 81.7 |
| 1 | 90.5 | 18.7 | 84.6 | 54.6 | 190.7 | 72.6 | 423.5 | 81.6 |
| 3 | 91.2 | 19.0 | 79.7 | 55.1 | 171.8 | 73.1 | 337.3 | 82.2 |
| 5 | 91.2 | 19.0 | 75.1 | 55.1 | 162.5 | 73.1 | 330.3 | 82.2 |

Ex.) Method for the calculation of the half-value period when the quantity added was 0 phm (1/100 value was omitted)
First Half-Value Period:

(90.7−18.8)/2+18.8=54.75%

The first half-value period was the time required for the transmittance to return to 54.7% from 18.8%.

Second Half-Value Period:

(90.7−54.75)/2+54.75=72.75%

The second half-value period was the time required for the transmittance to return to 72.7% from 18.8%.

Third Half-Value Period:

(90.7−72.75)/2+72.75=81.725%

The third half-value period was the time required for the transmittance to return to 81.7% from 18.8%.

Table 4 permits confirmation that the value of the nanoindentation hardness decreased and the photochromic film became more flexible as the quantity of hindered phenol compound that was added increased.

Table 5 permits confirmation that the first half-value period of the photochromic film decreased and the fading speed increased as the quantity of hindered phenol compound that was added increased. The same tendencies were observed for the second and third half-value periods.

The photochromic lens of the present invention has excellent photochromic properties and is suitable as an eyeglass lens.

BRIEF DESCRIPTION OF THE DRAWINGS

FIG. 1 It shows an example of a photochromic lens having a photochromic film.

FIG. 2 It shows a schematic diagram of the method of measuring nanoindentation hardness.

FIG. 3 It shows a schematic diagram of a lens casting mold that can be employed to manufacture the photochromic lens of the present invention.

FIG. 4 It shows an example of UV ozone treatment.

FIG. 5 It shows the results of measurement of the darkening density and darkening and fading speeds of the photochromic films on the photochromic lenses obtained in Examples 1 and 2 and the Comparative Example.

FIG. 6 It shows the results of measurement of the photochromic properties of the photochromic lens obtained in Example 4.

The invention claimed is:

1. A photochromic film comprising a photochromic dye and a resin component, which has a nanoindentation hardness of equal to or greater than 800 nm on at least one of surfaces, surface A, thereof, and
   wherein the surface A has a nanoindentation hardness smaller than that of the other side surface, surface B.

2. The photochromic film according to claim 1, wherein the surface A is placed on a surface side through which light enters when employed.

3. The photochromic film according to claim 1, wherein the surface B has a nanoindentation hardness ranging from 500 to 5000 nm.

4. The photochromic film according to claim 1, wherein
   the resin component comprises a cured resin formed by curing a curable component and an uncured curable component,
   the surface B and a vicinity thereof comprises a main component in the form of the cured resin,
   a content rate of the cured resin in the surface A and a vicinity thereof is lower than a content rate of the cured resin in the surface B and a vicinity thereof.

5. The photochromic film according to claim 4, wherein the curable component is an ultraviolet-curable component.

6. The photochromic film according to claim 1, further comprising a hindered amine compound and/or a hindered phenol compound.

7. A photochromic lens comprising a photochromic film on a lens substrate, wherein the photochromic film is the photochromic film according to claim 1 placed on the lens substrate so that the surface A is positioned on a surface side through which light enters.

8. The photochromic lens according to claim 7, wherein the photochromic film is placed so that the surface B that is the other surface of the surface A faces a surface of the lens substrate.

9. The photochromic lens according to claim 7, wherein the lens substrate is a formed article that has been obtained by heating a lens starting material liquid comprising a heat-curable component.

10. The photochromic lens according to claim 7, further comprising a hard coating and/or an antireflective film on a surface of the photochromic film, the surface being opposite to the surface facing the surface of the lens substrate.

11. A method of manufacturing a photochromic lens, wherein
   a photochromic liquid comprising a photochromic dye and a curable component is coated on one surface of a first mold for formation of one of surfaces of a lens,
   the photochromic liquid is subjected to curing treatment to form a photochromic film having a nanoindentation hardness ranging from 500 to 5000 nm on an outermost surface thereof as well as having a smaller nanoindentation hardness on a surface facing the first mold than that on the outermost surface,
   the first mold and a second mold for formation of the other surface of the lens are placed so that the outermost surface of the photochromic film faces a surface of the second mold, and a ring-shaped gasket is placed around the two molds to form a cavity with the two molds and the gasket, with the photochromic film being placed within the cavity,
   a lens starting material liquid comprising a curable component is introduced into the cavity and the curable component is subjected to curing reaction within the cavity to obtain a photochromic lens comprising a photochromic film on a lens surface.

12. The method of manufacturing a photochromic lens according to claim 11, wherein the curing treatment is conducted to the extent that a surface of the photochromic film facing the first mold has a nanoindentation hardness within a range of 800 to 5,000 nm.

13. The method of manufacturing a photochromic lens according to claim 11, wherein dry etching treatment with UV ozone or plasma is conducted onto the outermost surface of the photochromic film after formation of the photochromic film but before formation of the cavity.

14. The method of manufacturing a photochromic lens according to claim 11, wherein the curable component comprised in the photochromic film is a light-curable component and the curing treatment is conducted by light irradiation.

15. The method of manufacturing a photochromic lens according to claim 14, wherein the light irradiation comprises light irradiation onto the surface of the first mold on which the photochromic liquid has been coated.

16. The method of manufacturing a photochromic lens according to claim 14, wherein
   the first mold has an optical transparency,
   the light irradiation comprises light irradiation, through the first mold, onto the photochromic liquid which has been coated on the first mold.

17. The method of manufacturing a photochromic lens according to claim 16, wherein the light irradiation through the first mold is conducted at an irradiance level lower than that of the light irradiation onto the surface on which the photochromic liquid has been coated.

18. The method of manufacturing a photochromic lens according to claim 17, wherein the light irradiation through the first mold is conducted at an irradiance level ranging from 0.1 to 30 J/cm2, and the light irradiation onto the surface on which the photochromic liquid has been coated is conducted an irradiance level ranging from 1 to 100 J/cm2.

19. The method of manufacturing a photochromic lens according to claim 14, wherein the light irradiated has a wavelength ranging from 150 to 380 nm.

20. The method of manufacturing a photochromic lens according to claim 11, wherein the curable component comprised in the lens starting material liquid is a heat-curable component and the curing reaction is conducted by heating.

21. The method of manufacturing a photochromic lens according to claim 11, wherein the lens starting material comprises an ultraviolet absorbing agent.

22. The method of manufacturing a photochromic lens according to claim 11, wherein the photochromic liquid further comprises a hindered amine compound and/or a hindered phenol compound.

* * * * *